(12) United States Patent
Dang et al.

(10) Patent No.: US 8,345,955 B2
(45) Date of Patent: *Jan. 1, 2013

(54) CHARACTERIZING THERMOMECHANICAL PROPERTIES OF AN ORGANIC SUBSTRATE USING FINITE ELEMENT ANALYSIS

(75) Inventors: Hien Phu Dang, Nanuet, NY (US); Arun Sharma, New Rochelle, NY (US); Sri M. Sri-Jayantha, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1099 days.

This patent is subject to a terminal disclaimer.

(21) Appl. No.: 12/260,693

(22) Filed: Oct. 29, 2008

(65) Prior Publication Data

US 2009/0310848 A1 Dec. 17, 2009

Related U.S. Application Data

(63) Continuation-in-part of application No. 12/136,886, filed on Jun. 11, 2008, now abandoned, and a continuation-in-part of application No. 12/136,876, filed on Jun. 11, 2008, now abandoned.

(51) Int. Cl.
*G06K 9/00* (2006.01)
(52) U.S. Cl. .......... 382/154; 382/144; 382/145; 716/30; 716/51; 716/55
(58) Field of Classification Search .................. 382/144, 382/145, 152, 154; 716/30, 52, 53, 55
See application file for complete search history.

(56) References Cited

U.S. PATENT DOCUMENTS

| | | | |
|---|---|---|---|
| 7,227,568 B2 * | 6/2007 | Sun et al. ......................... | 348/58 |
| 7,977,718 B2 * | 7/2011 | Hannebauer ................... | 257/292 |
| 8,056,027 B2 * | 11/2011 | Dang et al. ...................... | 716/55 |
| 2010/0140768 A1 * | 6/2010 | Zafiropoulo et al. ......... | 257/686 |

OTHER PUBLICATIONS

Qizhou Yao et al., Three-Dimensional vs. Two-Dimensional Finite Element Modeling of Flip Chip Packages, J. Electronic Packaging, Dec. 1998, Georgia Institute of Technology, Atlanta, Georgia.
Zhuqing Zhang et al., FEM Modeling of Temperature Distribution of a Flip-Chip No-Flow Underfill Package During Solder Reflow Process, IEEE Transactions on Electronics Packaging Manufacturing, vol. 27, No. 1, Jan. 2004.

* cited by examiner

*Primary Examiner* — Gregory M Desire
(74) *Attorney, Agent, or Firm* — Daniel P. Morris; Ryan, Mason & Lewis, LLP

(57) ABSTRACT

A method for characterizing thermomechanical properties of an organic substrate is provided. The method includes the steps of: receiving an image of the organic substrate, the image including a geometric description of the plurality of circuit layers of the substrate; selecting a given one of the plurality of circuit layers for processing; converting the image to a two-dimensional finite element model (FEM) image of the given one of the circuit layers; determining at least one of a coefficient of thermal expansion (CTE), modulus and Poisson's ratio of the FEM image of the given one of the circuit layers; repeating the steps of selecting a given one of the plurality of circuit layers, converting the image to a two-dimensional FEM image, and determining at least one of a CTE, modulus and Poisson's ratio of the FEM image for all of the plurality of circuit layers corresponding to at least a portion of the organic substrate; and constructing a three-dimensional representation of at least a portion of the organic substrate including the plurality of circuit layers as a function of at least one of the CTE, modulus and Poisson's ratio of each of the plurality of circuit layers.

20 Claims, 18 Drawing Sheets

200

600

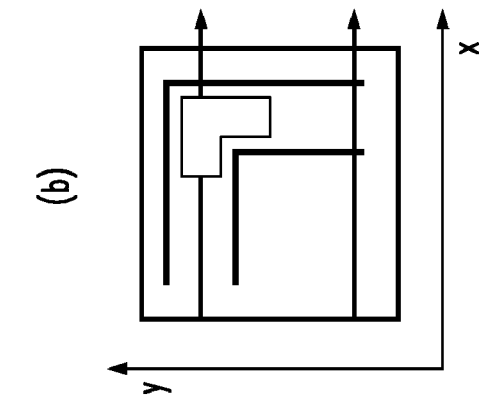
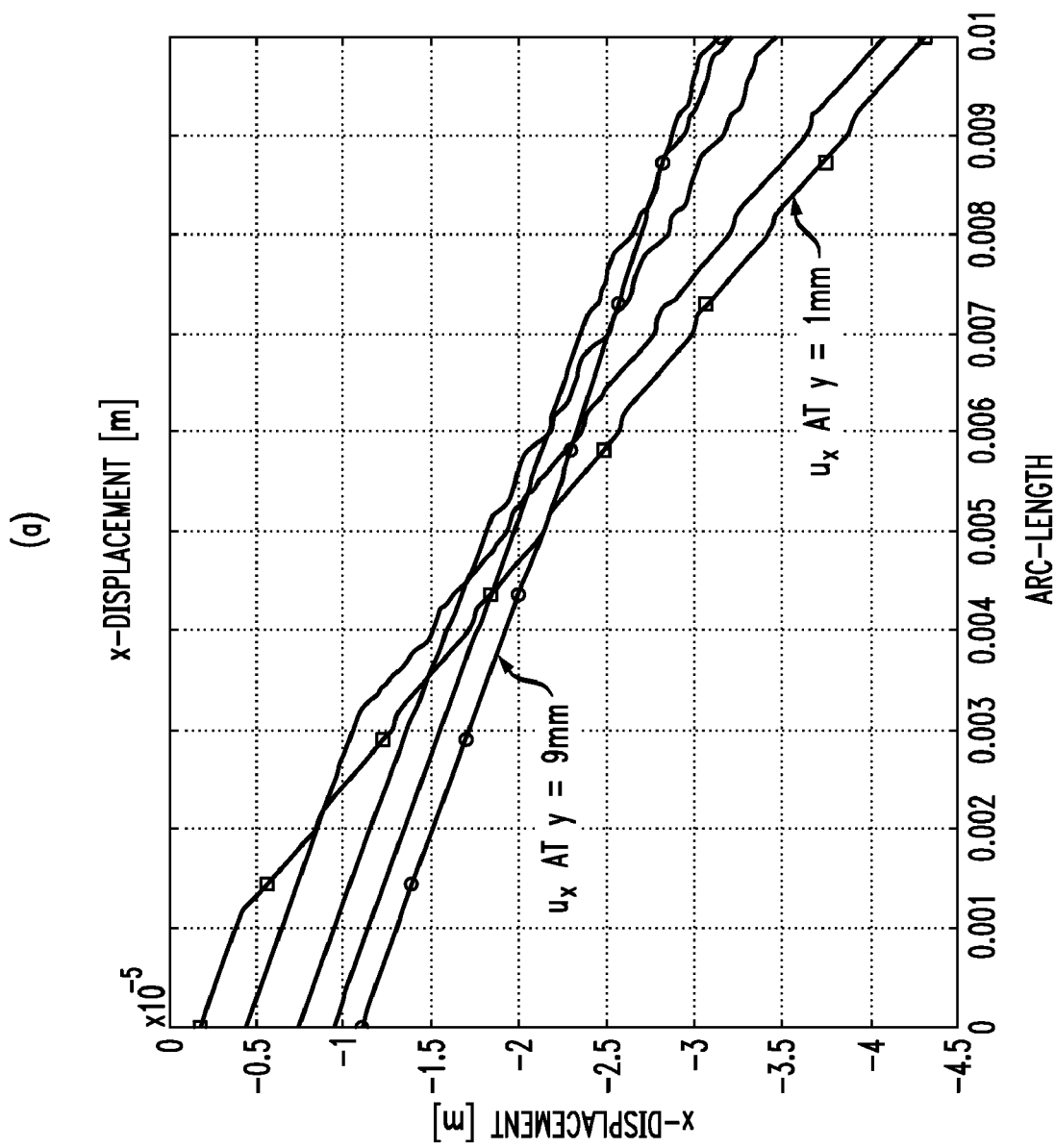
FIG. 8

900

FIG. 10
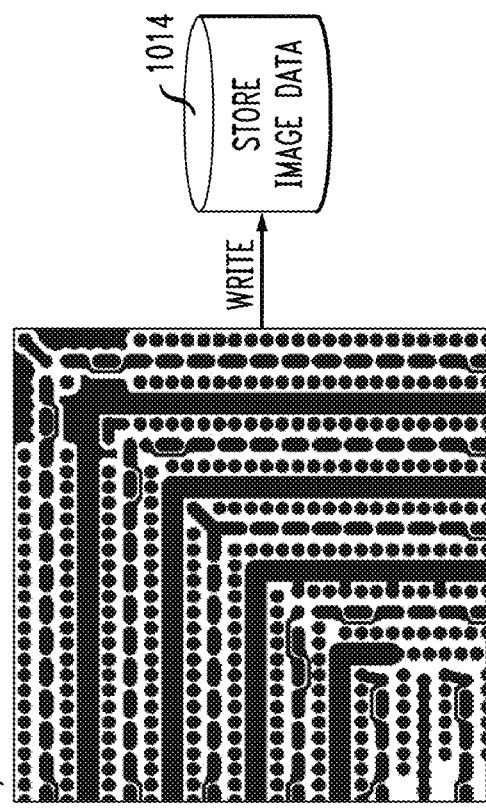
a) ORIGINAL BITMAP IMAGE
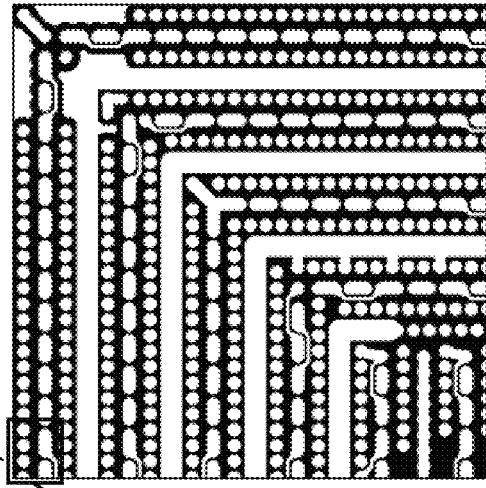
b) ENLARGED CORNER
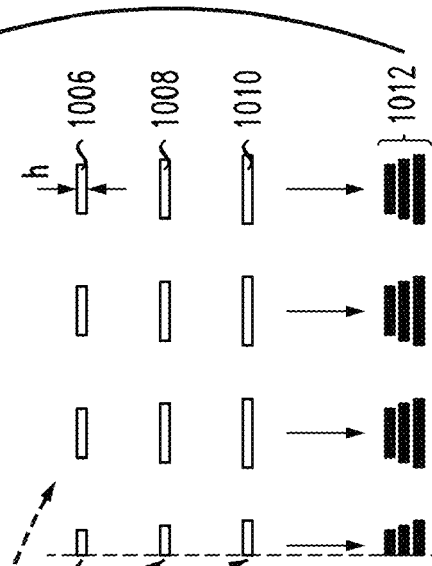
d) IMAGE SLICES
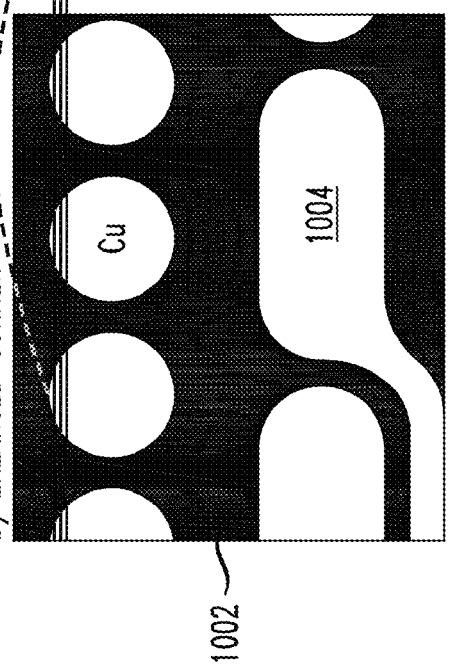
c) SLICE CONSTRUCTION

1800

CHARACTERIZING THERMOMECHANICAL PROPERTIES OF AN ORGANIC SUBSTRATE USING FINITE ELEMENT ANALYSIS

CROSS-REFERENCE TO RELATED APPLICATION(S)

This application is a continuation-in-part of U.S. application Ser. No. 12/136,886 filed on Jun. 11, 2008, now abandoned, and U.S. application Ser. No. 12/136,876 filed on Jun. 11, 2008, now abandoned, the disclosures of which are incorporated herein by reference in their entireties.

FIELD OF THE INVENTION

The present invention relates generally to electrical and electronic devices, and more particularly relates to organic substrate modeling.

BACKGROUND OF THE INVENTION

Projection of organic substrate warp is critical to cost effective development and production of an electronic module (microelectronic package). Current warp prediction (estimation) methodologies rely on significant approximations of the circuit structure of an organic chip carrier (substrate). These current prediction methods lead to a warp prediction that is often inaccurate, and thus not very useful. Ultimately, these inaccuracies result in organic chip carriers that are higher in cost and/or less reliable than desired. This can occur, for example, when an integrated circuit (IC) chip cannot be joined to the chip site due to poor chip site co-planarity. In other words, a flat chip cannot be joined to a non-flat substrate because interconnections may be misaligned causing electrical open-circuits.

Another manifestation of poor warp prediction is where, due at least in part to warp of the chip carrier, some inputs/outputs (I/O) of the chip cannot be connected to the organic chip carrier I/O where other chip I/O is able to be in a correct proximity to be joined. This may cause a high rework rate in manufacturing, thereby causing costs to increase. If this defect is not detected during in-line electrical testing, the reliability of the organic chip carrier may be compromised.

A silicon die with high density I/O requires an organic substrate to facilitate integration on a system board. A substrate usually consists of a core at the center and multiple layers of metal interconnects on both sides of the core. A substrate facilitates the formation of electrical links to the system board. The substrate also protects the die and modularizes the product development effort while simplifying the subsequent integration steps involved in the manufacturing of a larger computer or a consumer electronic product. The present trend in substrate technology is to transition from ceramic-based substrates to organic material-based systems. An organic polymer-based electronic substrate is a cost-effective means to fan out the I/O and power connections from a high density silicon die.

Organic substrates typically have a core about 400-800 microns (μm) thick, made of fiber reinforced organic or resin material. In order to reduce cost, the core is eliminated in some substrates (e.g., coreless substrate). Metal interconnects are progressively built, layer-by-layer, on a top and bottom of the core by a series of process steps. These steps typically involve electroless-plating, electroplating, etching, polishing, placement of dielectric resin, high temperature pressing of resin, etc. Each circuit interconnect layer or a power or ground plane is separated by a sheet of photosensitive resin. Laser drilling of the resin and an electroplating process are used to fabricate vias that help connect various conductive (metal) layers. Multi-stack vias are often used to link conductive layers that are further apart within the build layers of a substrate.

The build layers between the IC die and the core are generally referred to as "FC" front circuit) layers, and the layers on the opposite side of the core are generally referred to as "BC" (bottom circuit) layers. Since each metal layer is designed to optimize electrical performance, the mechanical characteristics of each metal layer is not precisely controlled. The FC layers generally have a dense interconnect structure made of metal lines, typically etched from a layer of copper deposited by means of a plating process. The BC layers, on the other hand, tend to have a continuous sheet of copper with distributed holes for vias to pass through. Such a configuration inevitably leads to a substrate with asymmetric thermomechanical properties when viewed with respect to a center plane of the core.

A substrate design with asymmetric thermo-mechanical properties produces a warp when it is constructed at high temperature and cooled down to room temperature. Work by L. Valdevit et al., *Microelectronics Reliability* 48 (2008) p. 245-260, published by Elsevier Ltd., the disclosure of which is incorporated herein by reference, provides a thermo-mechanical model that accounts for heterogeneity and anisotropy of an organic chip board design file representative of an organic chip carrier (substrate). In this model, standard laminate plate theory is considered in the calculation of Young's moduli, Poisson's ratio and coefficients of thermal expansion of an organic chip carrier to predict distortion. Preliminary warp prediction of a flip-chip (C4) organic chip carrier is presented.

Electronic manufacturing and assembly operations incorporating a substrate typically require the substrate to exhibit a warp that is within a minimum acceptable range. For example, for a substrate with 55×55 millimeter (mm) dimensions in an x-y plane, a warp of up to about 100 μm is typically considered acceptable. As the number of buildup layers and core thicknesses are changed, the warp levels can change according to their interaction with one another. The yield of substrates can be undesirably reduced if parametric symmetry is not maintained within corresponding limits.

SUMMARY OF THE INVENTION

Illustrative embodiments of the present invention provide techniques for accurate warp projection of an organic chip carrier (substrate). Embodiments of the invention circumvent the need for a laminate theory approach by launching a three-dimensional (3-D) description of the layers of an organic chip carrier or a laminate substrate. The present invention preferably facilitates a best representation of a "real" organic substrate without making any image related approximations.

Aspects of the invention convert a two dimensional layer of an organic chip carrier board design file into a geometry compatible with a finite element method (FEM), wherein the geometry is a FEM-compatible two-dimensional (2-D) object. Further aspects of the invention then embed a copper circuit layer with dielectric resin. The resin-embedded 2-D geometry is then subjected to numerical operations that closely simulate an actual measurement process required to obtain thermomechanical properties of a 2-D object subjected to a plane stress condition (e.g., no stress is applied to the 2-D object normal to its plane). The operation is repeated for each circuit layer corresponding to a tile. The required orthotropic material property of a tile is then computed using principles of laminate theory in which the circuit layers are assumed to be separated by a dielectric layer. The process is repeated to obtain the material property of each tile. The tiles are finally assembled in a FEM environment to represent the full chip carrier in order to predict warp (deformation) by a warp predictor tool, or to be used in an alternative application (e.g., stress analysis). Various levels of approximations can be made in this illustrative method depending on the desired requirements of speed of thermomechanical parameter computation versus accuracy of thermomechanical parameter computation.

In accordance with one aspect of the invention, a method of characterizing an organic substrate including a plurality of circuit layers is provided. The method includes the steps of: receiving an image of the organic substrate, the image including a geometric description of the plurality of circuit layers of the substrate; selecting a given one of the plurality of circuit layers for processing; converting the image to a two-dimensional finite element model (FEM) image of the given one of the circuit layers; determining at least one of a coefficient of thermal expansion (CTE), modulus and Poisson's ratio of the FEM image of the given one of the circuit layers; repeating the steps of selecting a given one of the plurality of circuit layers, converting the image to a two-dimensional FEM image, and determining at least one of a CTE, modulus and Poisson's ratio of the FEM image for all of the plurality of circuit layers corresponding to at least a portion of the organic substrate; and constructing a three-dimensional representation of at least a portion of the organic substrate including the plurality of circuit layers as a function of at least one of the CTE, modulus and Poisson's ratio of each of the plurality of circuit layers.

In accordance with another aspect of the invention, an apparatus for characterizing an organic substrate including a plurality of circuit layers includes memory and at least one processor coupled to the memory. The processor is operative: to receive an image of the organic substrate, the image including a geometric description of the plurality of circuit layers of the substrate; to select a given one of the plurality of circuit layers for processing; to convert the image to a two-dimensional finite element model (FEM) image of the given one of the circuit layers; to determine at least one of a coefficient of thermal expansion (CTE), modulus and Poisson's ratio of the FEM image of the given one of the circuit layers; to repeat steps of selecting the given one of the plurality of circuit layers, converting the image to a two-dimensional FEM image, and determining at least one of a CTE, modulus and Poisson's ratio of the FEM image for all of the plurality of circuit layers corresponding to at least a portion of the organic substrate; and to construct a three-dimensional representation of at least a portion of the organic substrate including the plurality of circuit layers as a function of at least one of the CTE, modulus and Poisson's ratio of each of the plurality of circuit layers.

These and other features, objects and advantages of the present invention will become apparent from the following detailed description of illustrative embodiments thereof, which is to be read in connection with the accompanying drawings.

BRIEF DESCRIPTION OF THE DRAWINGS

FIGS. 8A and 8B depict an exemplary method for graphically selecting a trace to estimate effective thermal contraction for the illustrative structural pattern shown in FIG. 6, in accordance with an embodiment of the present invention.

FIGS. 10A through 10D depict steps in an exemplary method for generating a finite element model (FEM) image of at least a given portion of an organic substrate from a bitmap image of the given portion of the substrate, in accordance with an embodiment of the present invention.

DETAILED DESCRIPTION OF THE INVENTION

The present invention will be described herein in the context of illustrative methodologies using FEM in conjunction with principles of laminate theory for improving the prediction of warp in an organic chip carrier or substrate laminate. Embodiments of the invention divide the substrate into a plurality of "tiles" and then generate a FEM image for each tile by effectively slicing a 2-D image of the tile and importing the image slices into a FEM geometry generator to create the FEM image. This methodology mimics an actual substrate manufacturing process, and facilitates an enhanced representation of a real organic substrate without making any image related approximations. It is to be appreciated, however, that the techniques of the present invention are not limited to the specific methods and application shown and described herein. Rather, embodiments of the invention are directed broadly to improved techniques for generating a more accurate thermomechanical model representing a circuit or circuit structure.

While techniques of the present invention are described herein with specific reference to substrate warp prediction, it is to be appreciated that these techniques are not limited to such an application. Instead, embodiments of the invention may be well-suited for other applications, including, but not limited to, stress analysis. For this reason, numerous modifications can be made to the embodiments described herein, including, for example, elimination of one or more steps in an illustrative embodiment of the invention, and the results will still be within the scope of the invention. No limitations with respect to the specific embodiments described herein are intended or should be inferred.

Figure 1:
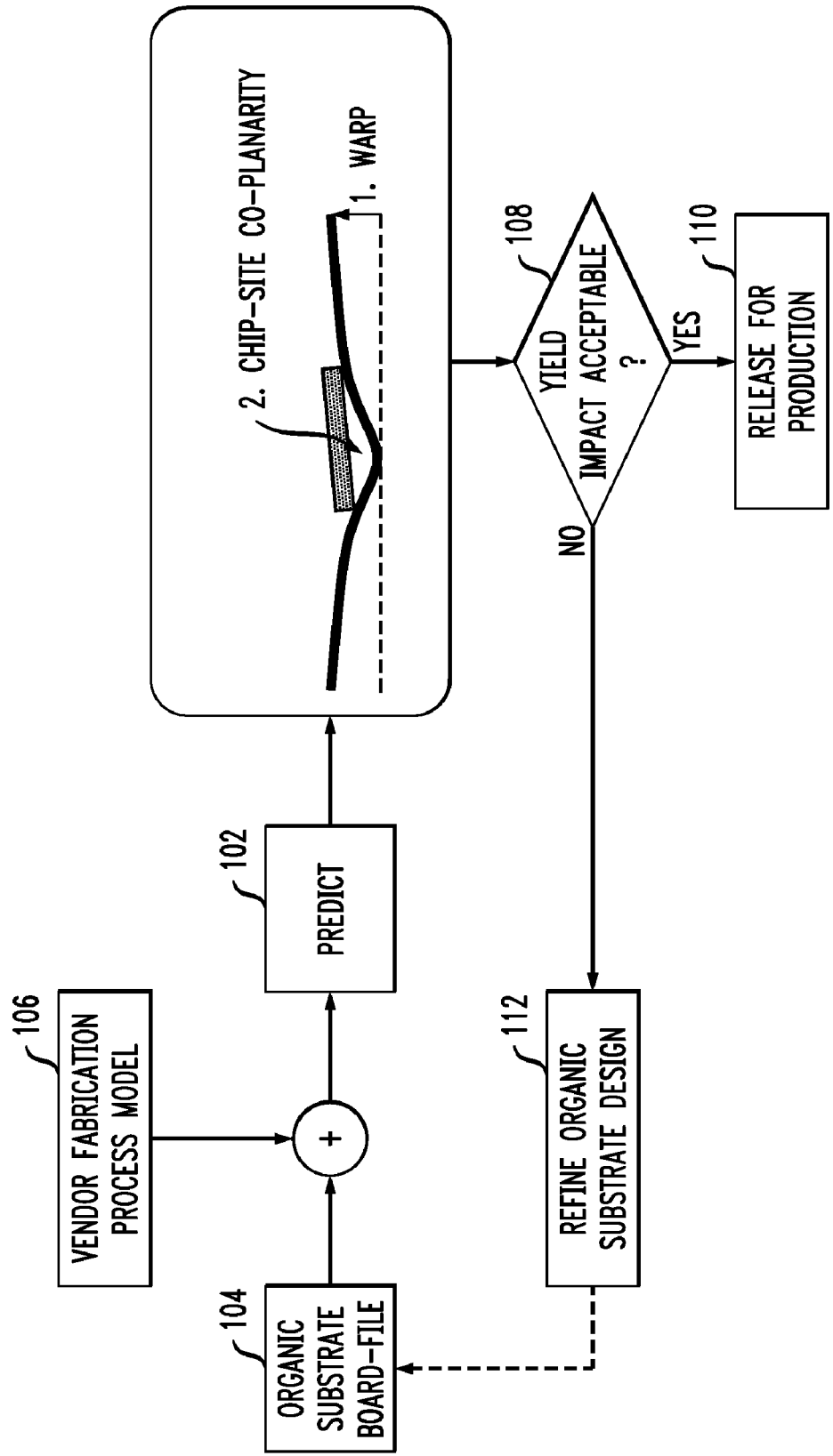
FIG. 1 is a conceptual block diagram depicting an exemplary chip design methodology in which techniques of the present invention can be implemented.

FIG. 1 is a conceptual block diagram depicting an exemplary chip design methodology 100 in which techniques of the present invention can be implemented. In accordance with chip design methodology 100, a prediction model is generated in block 102 as a function of both an organic substrate board file 104 and a vendor chip fabrication process model 106. The prediction model 102 preferably generates an estimation of organic substrate warp and chip-site co-planarity. If the estimated amount of substrate warp and/or chip-site co-planarity determined in block 102 is within prescribed acceptable limits for chip yield impact, as determined in step 108, the chip is released for fabrication (production) in step 110. Otherwise, the organic substrate design is refined in step 112, which will most likely involve modifying the organic substrate board file 104, and the process is repeated in an iterative manner as shown so as to minimize expected substrate warp prior to vendor fabrication.

Figure 2:
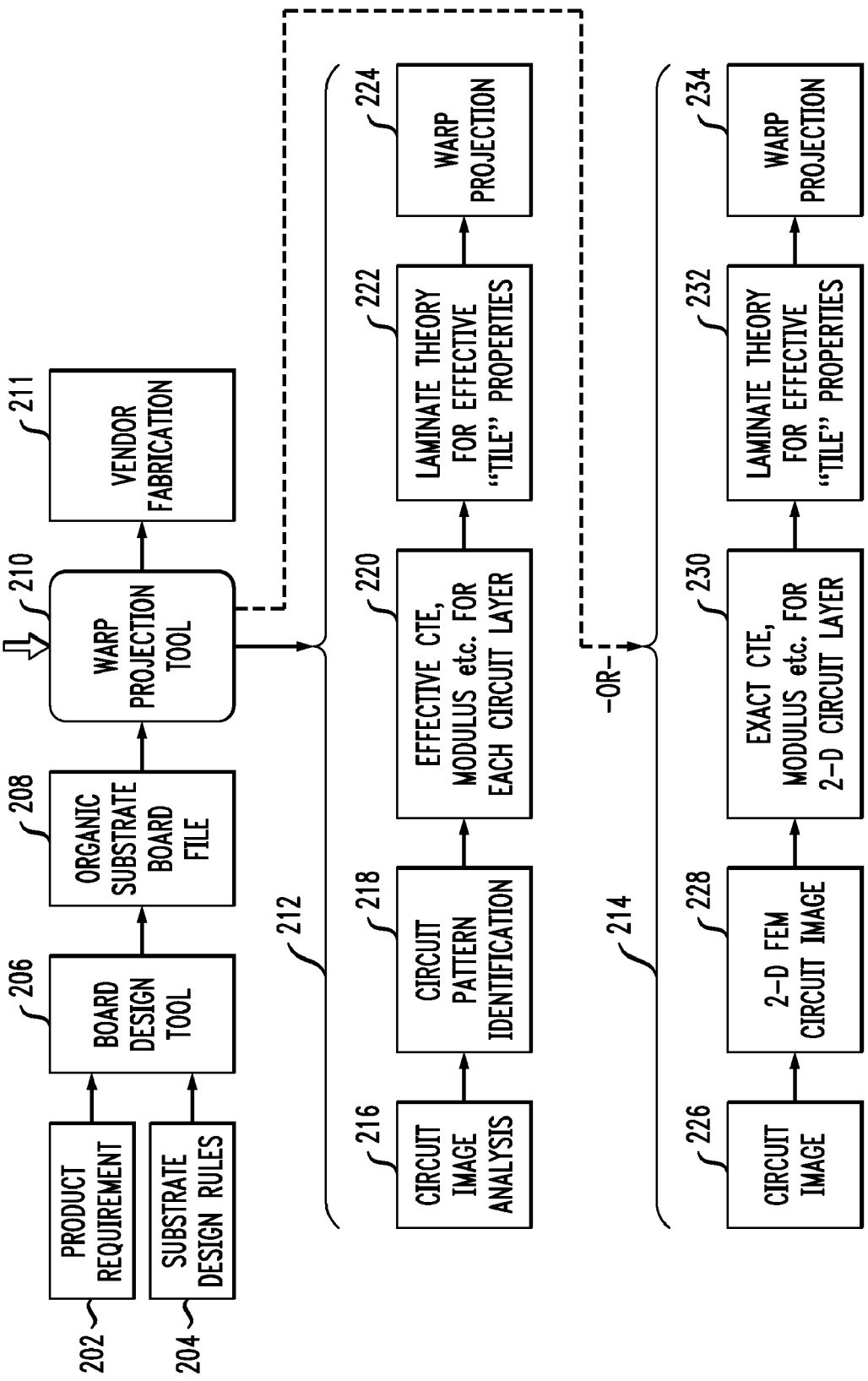
FIG. 2 is a conceptual block diagram depicting an exemplary chip carrier (substrate) design process including two alternative warp projection methodologies, in accordance with embodiments of the present invention.

FIG. 2 is a flow diagram depicting an exemplary chip design method 200 including two alternative warp projection methodologies, 212 and 214, according to embodiments of the invention. As apparent from the figure, product requirements 202 and substrate design rules 204 are incorporated by a board design tool 206 to generate an organic substrate board file 208. As previously explained, the board file includes, among other things, a geometric description of the organic substrate. The board file 208 is supplied to a substrate warp projection (e.g., estimation) tool 210 to determine whether or not to allow the chip design to proceed to vendor fabrication 211.

An organic substrate essentially comprises non-uniformly patterned metal layers, usually formed of copper. As used herein, the term "copper" may be used interchangeably with the term "metal," although it is to be understood that the metal or copper structures may alternatively be formed of other conductive materials, and that such materials are within the scope of the present invention. By segmenting an organic substrate into a finite number of "tiles," as shown, for example, in FIG. 3, the distribution of the metal parameters in an x,y plane can be captured. Each tile preferably includes layers that represent copper circuit layers or resin layers (or other dielectric layers) used to separate two adjacent copper circuit layers.

Figure 3:
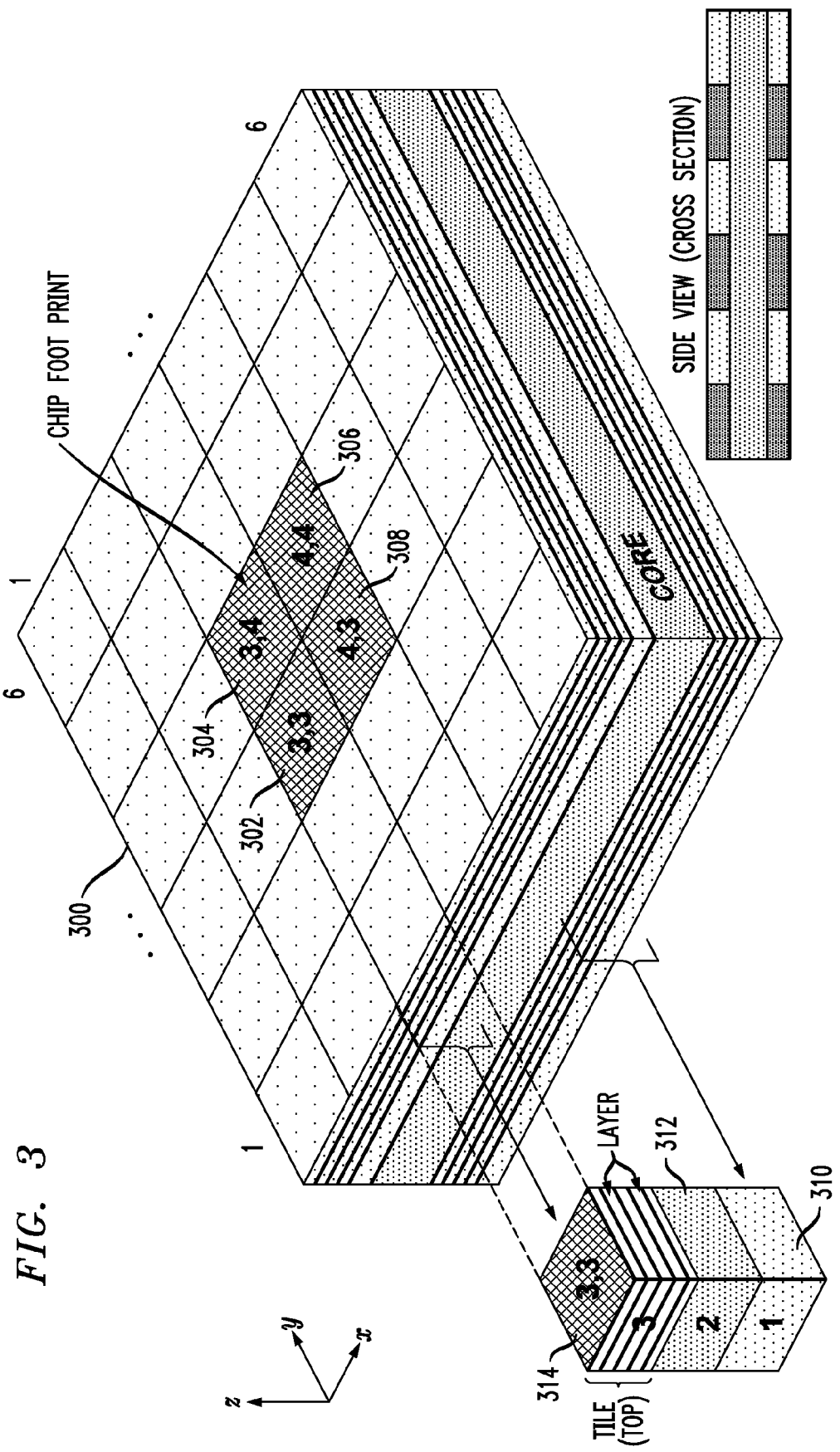
FIG. 3 is an isometric view depicting an exemplary organic substrate segmented into a plurality of tiles for prediction model generation, in accordance with an embodiment of the present invention.

With reference to FIG. 3, an isometric view depicting an exemplary organic substrate structure 300 is shown. The substrate 300 is segmented into 36 tiles arranged in a 6×6 array (e.g., six rows in an x-direction and six rows in a y-direction). A given tile may be arbitrarily assigned a unique x,y position in the array. For example, tile 302 may be designated as tile (3,3), since it is located at x position 3, y position 3. Similarly, tile 304 may be designated as tile (3,4), tile 306 may be designated as tile (4,4), and tile 308 may be designated as tile (4,3). In a preferred embodiment, the substrate 300 is divided into 12×12 equal size tiles. As the number of tiles into which the substrate 300 is divided is decreased, the amount of memory required to store all of the geometric parameters associated with a given tile increases accordingly, since the number of circuit features (geometries) within the given tile generally increases with tile size. It is to be appreciated, however, that the invention is not limited to any specific number of tiles into which the substrate 300 may be divided. Furthermore, a footprint of any given tile need not be square (as shown), but rather may be rectangular.

Each x,y zone (for example 3,3) preferably includes three tiles in a z direction (e.g., cross section), namely, a first tile 310, which may include all bottom circuit (BC) layers, a second tile 312, which may be a core, and a third tile 314, which may include all front circuit (FC) layers. More particularly, each of the tiles 310 and 314 preferably forms a sandwich structure including a plurality of circuit layers, with a dielectric insulating layer formed between any two adjacent circuit layers for electrically isolating the circuit layers from one another. The core layer 312 may also comprise multiple layers. The invention is not limited to any specific number of circuit layers and/or core layers forming the substrate 300.

As shown in FIG. 2, warp projection tool 210 may be operative to perform multiple warp projection methodologies, such as, for example, a first illustrative warp projection method 212 providing a faster output result compared to a second illustrative warp projection method 214, but at the expense of reduced accuracy. Generally, accuracy of the warp prediction model will be traded for computational time. For applications in which a high level of warp prediction accuracy is required and computational speed is not critical, method 214 is preferably employed and method 212 can therefore be eliminated, or at least disabled. Likewise, for applications in which computational speed is critical and warp prediction accuracy can be compromised, method 212 is preferably used and method 214 can be eliminated, or at least disabled.

The invention contemplates that other warp prediction methodologies can be employed which provide a desired trade-off between computational speed and accuracy. For example, a combination of method 212 and 214 can be used to trade-off speed and accuracy. The zone under the chip typically requires more accurate estimation of thermomechanical parameters than remaining zones, and method 214 can be applied in this zone while remaining zones can be characterized using method 212, according to other aspects of the invention.

First warp projection method 212 includes a circuit image analysis step 216 followed by a circuit pattern identification step 218. Circuit image analysis 216 may include, for example, obtaining an image of the organic substrate structure (e.g., from a board file or alternative geometric description file) and segmenting the organic substrate into a plurality of tiles based, at least in part, on x,y coordinates of circuit structures defined in the board file or alternative geometric description file.

Based on the circuit pattern identification information generated in step 218, one or more parameters (e.g., effective CTE, modulus, etc.) are determined in step 220 for each layer of the organic substrate. Based on principles of laminate theory, and using computed parameters (e.g., stored in look-up tables, etc.) corresponding to the various layers, a 3-D model representing the substrate is constructed for each tile in step 222. The 3-D model is then used in step 224 to determine a warp projection for the organic substrate. This warp projection may be used in determining whether or not to allow a design to proceed to fabrication.

Figure 4:
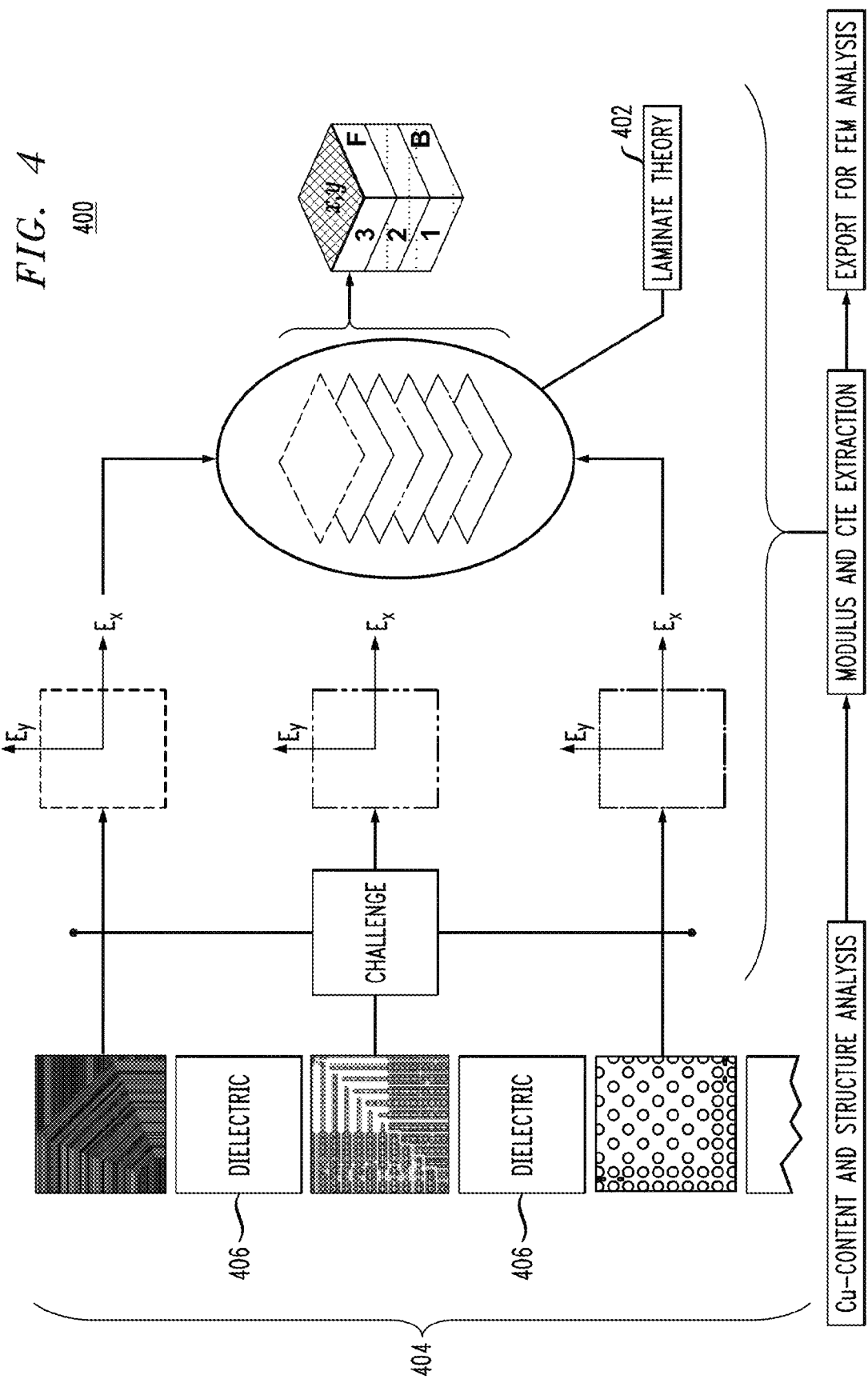
FIG. 4 is a conceptual view depicting an exemplary method of applying principles of laminate theory to obtain "tile" thermo-mechanical properties of an organic substrate for finite element model analysis, in accordance with an embodiment of the present invention.

FIG. 4 is a conceptual view depicting an exemplary method 400 of applying principles of laminate theory 402 to obtain thermomechanical properties for each tile of an organic substrate for FEM analysis, according to an aspect of the invention. Method 400 preferably provides a systematic approach to developing a warp projection model using principles of laminate theory. Laminate theory, in the general sense, has been employed to study products having multiple layers of material joined together. However, a restriction in conventional applications of laminate theory is that each of the layers be formed using a uniform structure. For example, a cross-ply laminate structure (e.g., consisting of an arbitrary number of layers of the same material and thickness but with alternating orientations of 0° and 90°) formed using fiber-reinforced plastic, can be analyzed using existing tools. An organic substrate, in contrast, is comprised of multiple layers 404, but with each circuit layer having highly non-uniform circuit patterns. Dielectric layers 406 may be treated as being substantially uniform. Hence, in applying principles of laminate theory to an organic substrate, one challenge is in converting the complex organic substrate structure into an equivalent orthotropic representation so that subsequent warp model building can be undertaken.

Figure 5:
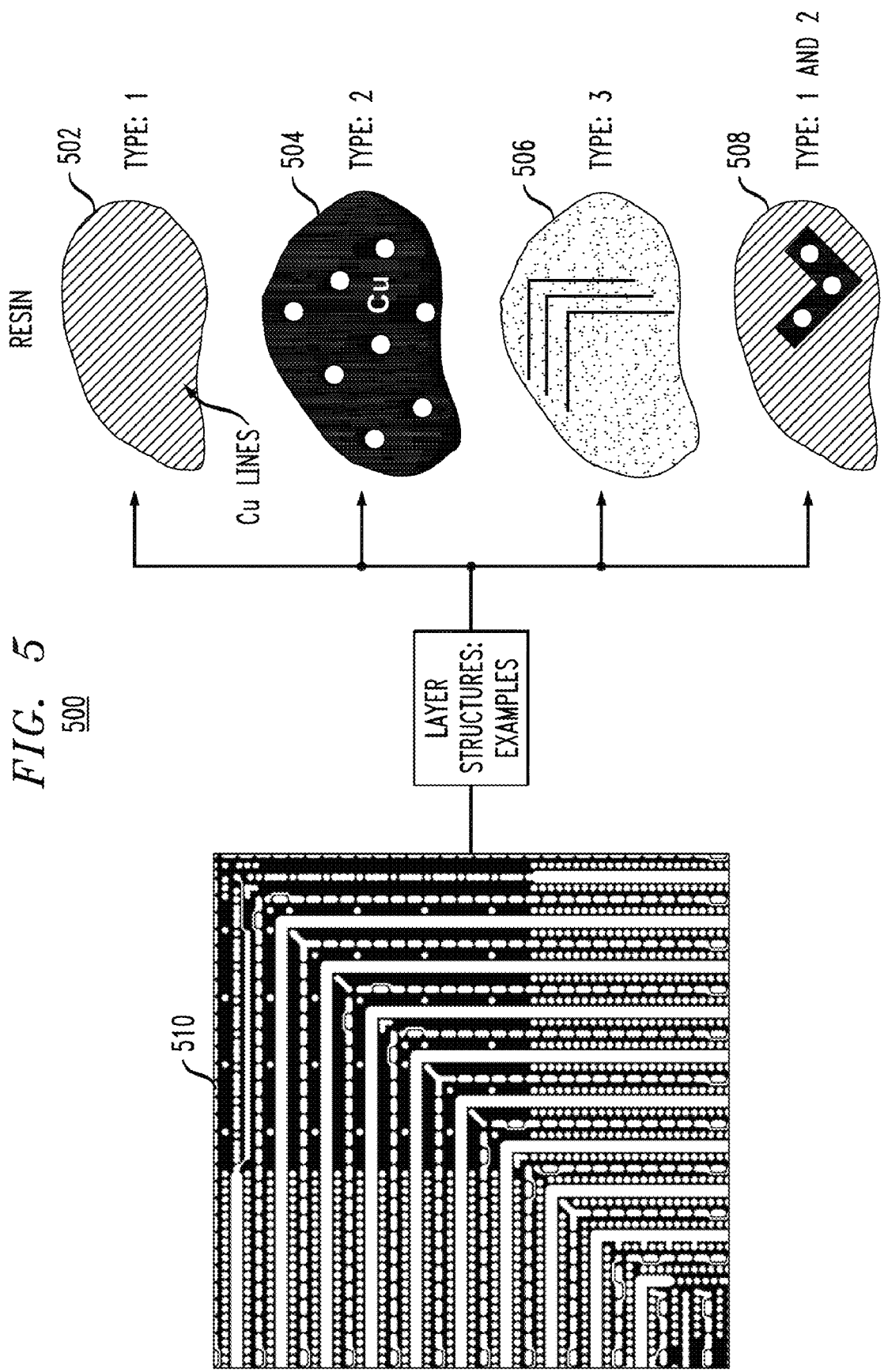
FIG. 5 depicts an exemplary process for identifying structures in a tile of an organic substrate, in accordance with an embodiment of the present invention.

As part of the circuit pattern identification process (e.g., step 218 in FIG. 2), once a decision on tile size is made, a key challenge is in developing a methodology to identify copper patterns using, for example, image processing techniques. FIG. 5 conceptually illustrates an exemplary process 500 for identifying structures in a tile of an organic substrate, according to an aspect of the present invention. For example, a subset of exemplary patterns, 502, 504, 506 and 508, found in at least a portion of a circuit layer 510 are shown. By way of example only, patterns 502, 504 and 506 may exhibit arbitrarily designated type 1, 2 and 3 patterns, respectively, with an identifiable dominant feature, whereas pattern 508 exhibits multiple features (in this case, two) drawn from types 1 and 2 and may pose a challenge in identifying the circuit structure using an automated process. Thus, it is advantageous to circumvent the need to identify complex features of a given circuit layer.

Preferably, the structure of a layer in the substrate is first determined, and then the thermomechanical parameters (e.g., CTE, modulus, Poisson's ratio, etc.) corresponding to the structure are extracted. Such thermomechanical parameters may be extracted from analytical expressions or from stored parametric curves (e.g., look-up tables) generated through analysis of the circuits prior to application of the principles of laminate theory. For example, at least a portion of the image of circuit layer 510 shown in FIG. 5 can be simplified and schematically represented by the geometry 600 shown in FIG. 6. The geometry 600 of FIG. 6 can be reproduced in a FEM analysis environment and the thermomechanical properties can be approximated using methodologies known by those skilled in the art. For the circuit pattern 502 in FIG. 5, when the lines are horizontally oriented, the effective modulus in the horizontal direction can be computed using, for example, a mixing law for modulus: fraction of copper area*modulus of copper+fraction of resin*modulus of resin.

Figure 6:
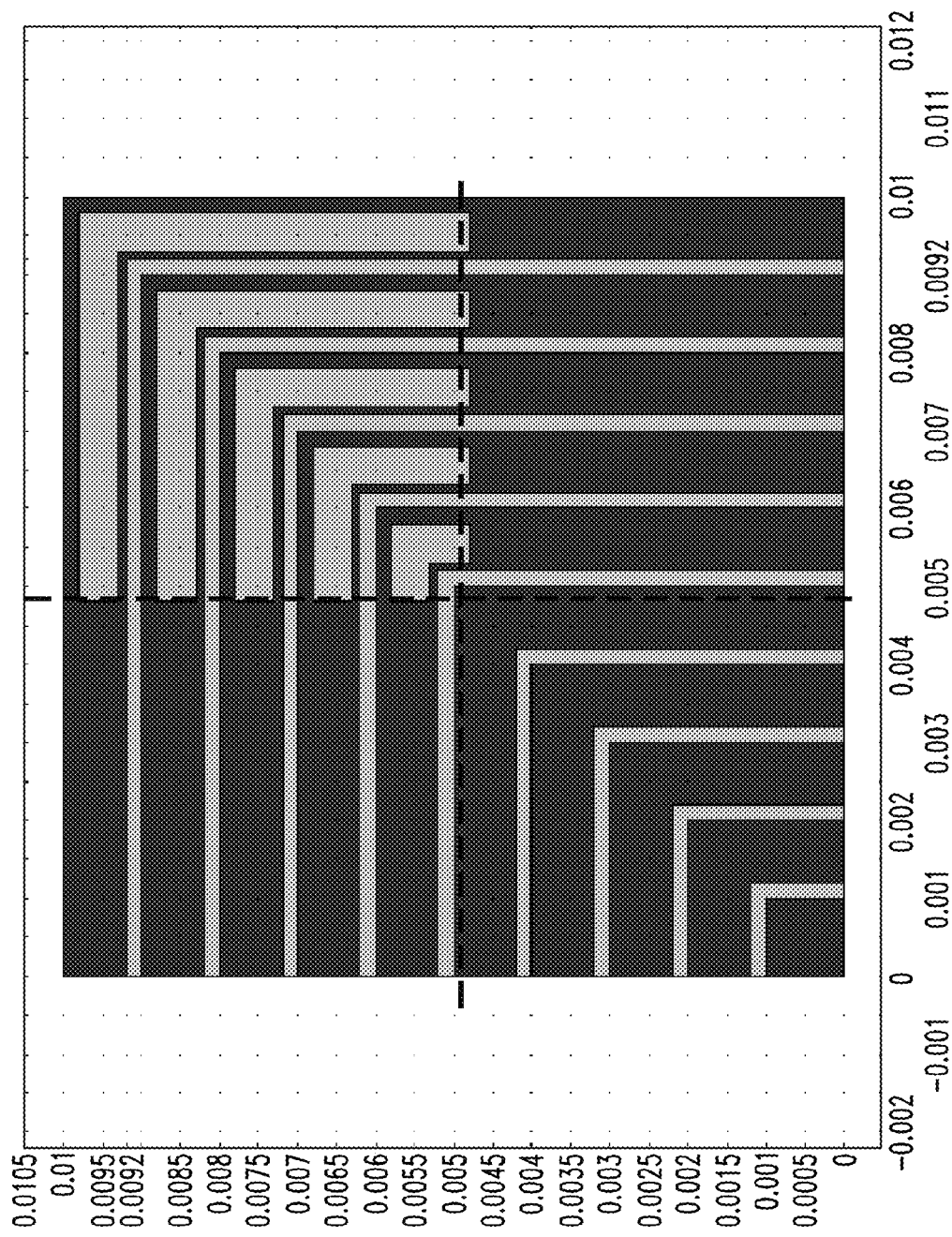
FIG. 6 is a top plan view depicting at least a portion of one type of structural pattern in an exemplary circuit layer of an organic substrate, in accordance with an embodiment of the present invention.
Figure 7:
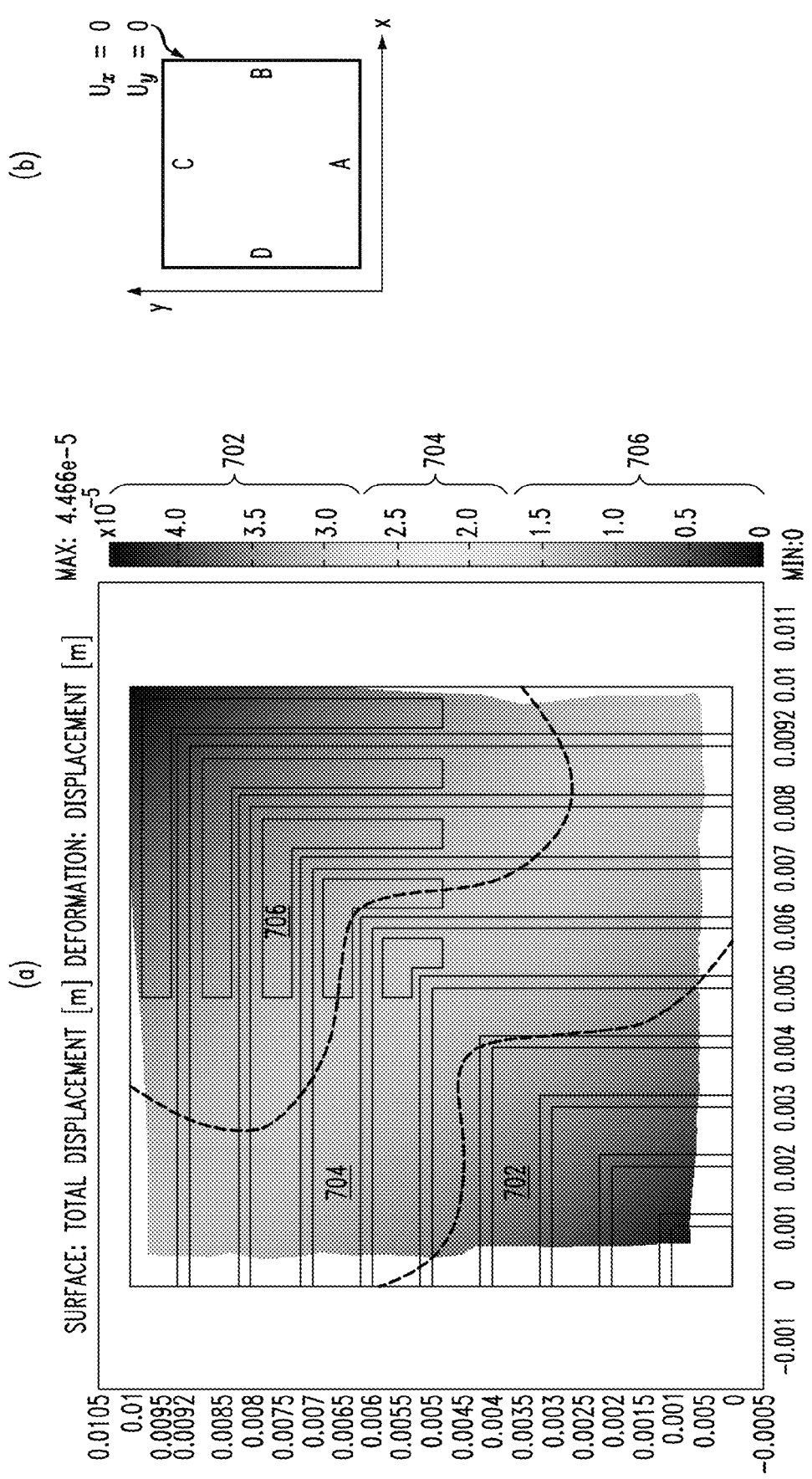
FIGS. 7A and 7B depict an exemplary method for determining a coefficient of thermal expansion (CTE) for the illustrative structural pattern shown in FIG. 6, in accordance with an embodiment of the present invention.

FIGS. 7A and 7B depict an exemplary methodology for determining CTE for the illustrative structural pattern 600 shown in FIG. 6, according to an aspect of the invention. Specifically, FIG. 7A shows the effect of temperature on a contraction of the geometry. Three general displacement regions are shown: larger displacement region 702 (e.g., in the range of about 30-50 μm (micrometers)), a nominal displacement region 704 (e.g., from about 20 μm to 30 μm), and a smaller displacement region 706 (e.g., less than about 15 μm). The boundary conditions for this example are shown in FIG. 7B. In FIG. 7B, $U_x$ represents a displacement function in the x-direction, and $U_y$ represents a displacement function in the y-direction. By estimating the thermal contraction, an effective CTE can be computed for the geometry.

FIGS. 8A and 8B conceptually depict the exemplary graphical selection of a line for estimating effective thermal contraction for the illustrative structural pattern 600 shown in FIG. 6, according to an aspect of the invention. For example, FIG. 8A shows the displacement of points along various lines taken parallel to the x-axis. The magnitudes of displacement for a given geometry vary as a function of the choice of the line, thus resulting in a range of possible CTE values. Thus, a better method for estimating an effective CTE is required. For example, by consistently choosing the diagonal of a layer, a CTE value can be computed.

Figure 9:
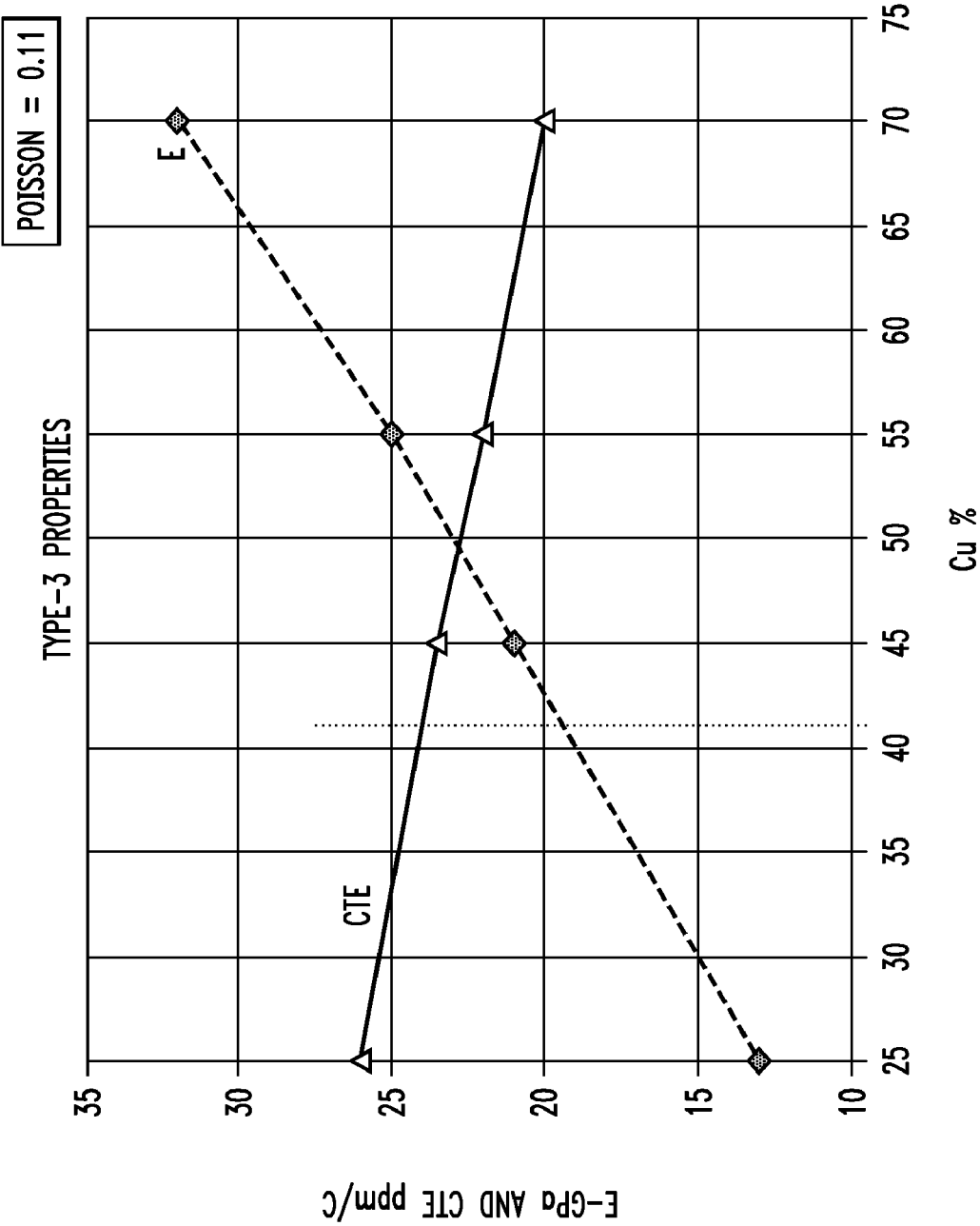
FIG. 9 is a graph depicting an exemplary parametric curve for a structural pattern of the type shown in FIG. 6, in accordance with an embodiment of the present invention.

As shown in FIG. 8B, modulus values can be computed by numerically simulating a stretching experiment of a layer specimen in the FEM environment. Such an experiment, repeated for different percentage amounts of copper content in a given layer of a tile, can generate a parametric curve for each thermomechanical parameter. FIG. 9 is a graph depicting an exemplary parametric curve 900 for a structural pattern (e.g., 506) of the type-3 pattern, shown in FIG. 6, in accordance with an embodiment of the present invention.

With reference again to FIG. 2, a limitation of the first warp projection method 212 is that complex circuit images are confined to fit into a finite number of predetermined patterns, referred to as templates (see, e.g., FIG. 5). Therefore, the parameter estimation error due to image approximations can accumulate over each layer as well as for each tile, resulting in increased warp projection error. The second warp projection method 214 beneficially provides a better technique which circumvents image template-based warp estimation, and thereby improves accuracy of the warp projection model.

According to the second warp projection method 214, a circuit image of the organic substrate is preferably generated in step 226. The organic substrate is typically comprised of non-uniformly patterned metal layers, usually made of copper (referred to interchangeably with metal). Many conventional approaches to estimating warp of an organic substrate employ significant approximations, such as assuming each circuit layer in the substrate to be formed of a homogeneous material, thereby inherently introducing undesirable inaccuracies into the warp prediction model. The circuit image step 226 may include, for example, obtaining an image of the organic substrate from a board file, a bitmap image, or an alternative geometric description file, segmenting the organic substrate into a plurality of tiles, or alternative regions (as noted above), and determining whether a given layer in the substrate is comprised primarily of patterned lines and/or geometric shapes, in the case of a circuit layer, or is substantially solid, in the case of, for example, a dielectric isolation layer formed between adjacent circuit layers in the substrate.

In alternative embodiments of the invention, the circuit image may be stored in memory (e.g., as a net file) and provided directly to a subsequent processing block (e.g., FEM conversion block 228), in which case step 226 may be omitted. By segmenting the organic substrate into a finite number of tiles, as shown in FIG. 3, the distribution of metal parameters in an x,y plane can be captured.

In step 228, each distinct layer of the circuit image corresponding to the organic substrate is converted to a 2-D FEM representation of the circuit image. This can be accomplished, for example, using a FEM geometry generator, or alternative processor. As previously stated, the circuit image may comprise a bitmap image of the organic substrate obtained, for example, from a board file or alternative geometric description of the organic substrate structure.

An exemplary FEM geometry generator, in which one or more functions of step 228 may be implemented, preferably receives, as input, geometric descriptions having clearly defined line boundaries, in this case, copper boundaries, to generate an object. Hence, a generic bitmap of a circuit layer should not be unconditionally imported into a FEM geometry generator and expect the FEM geometry generator to determine the copper regions and resin regions, alternatively referred to herein as domains. New methods are required to import complex images of a circuit layer to generate the 2-D FEM circuit image.

There are commercially available programs that can be utilized to translate bitmap images to formats that a FEM program can understand. One widely used program suitable for translating bitmap images to a FEM-compatible format is Drawing Exchange Format (DXF), or derivatives thereof (e.g., data exchange file, structured DXF (SDXF), etc.). DXF is a computer aided design (CAD) data file format originally developed by Autodesk, Inc. for enabling data interoperability between AutoCAD®, a registered trademark of Autodesk, Inc., and other programs. The software translator detects the edges of bitmap objects and draws line segments representing boundaries. This works fine for CAD drawings, but for FEM, all features inside a given boundary are treated as homogeneous, and thus internal details are effectively lost. For example, a circular ring structure would be seen as a solid disk, where the center hole is automatically filled by the FEM geometry builder.

To circumvent this problem, for each cross-sectional layer in a tile of the substrate, the bitmap image is preferably divided into a plurality of slices taken along at a given direction (e.g., x-direction) as part of the functionalities of step 228. These slices are imported into the FEM geometry generator in obtaining the 2-D FEM circuit image.

FIGS. 10A through 10D depict steps in an exemplary method 1000 for generating a 2-D FEM image of at least a given portion of an organic substrate from the corresponding bitmap image of the given portion of the substrate, in accordance with an embodiment of the present invention. FIG. 10A shows the original bitmap image of one tile of the circuit layout. FIG. 10B is an expanded view of the top-left corner of the bitmap image shown in FIG. 10A. The black portion 1002 of the image represents resin, and the white portion 1004 of the image represents copper. Of course, these color designations are arbitrarily assigned; it is to be appreciated that the invention is not limited to any particular color assignment. The three horizontal lines shown on the upper portion of FIG. 10B represent slices of the image taken in the horizontal direction.

With reference to FIG. 10C, each copper geometry (feature) is preferably cut into N individual slices 1006, 1008, 1010, where N is an integer. The individual slices are then combined together to form a stacked structure 1012 representing the original bitmap feature as a function of individual polygons, each polygon having a height, h, equal to a thickness of the slices. Although exemplary method 1000 is depicted as slicing the bitmap image along the x-axis (horizontal) direction, the slices may, alternatively, be taken in the y-axis (vertical) direction, or another direction (e.g., diagonally), and then reconstructed by stacking the slices vertically rather than horizontally, as will become apparent to those skilled in the art given the teachings herein.

FIG. 10D illustrates an image, representing the original bitmap image shown in FIG. 10A, reconstructed from the individual image slices shown in FIG. 10C. In FIG. 10D, the black portions of the image slices represent copper and the white portions of the image slices represent resin, thereby essentially forming a negative of the original bitmap image shown in FIG. 10A. The image data comprised of the geometric feature slices may be stored in memory 1014 and subsequently exported for FEM analysis, or alternative processing. This methodology is repeated for each tile in the substrate.

Figure 11:
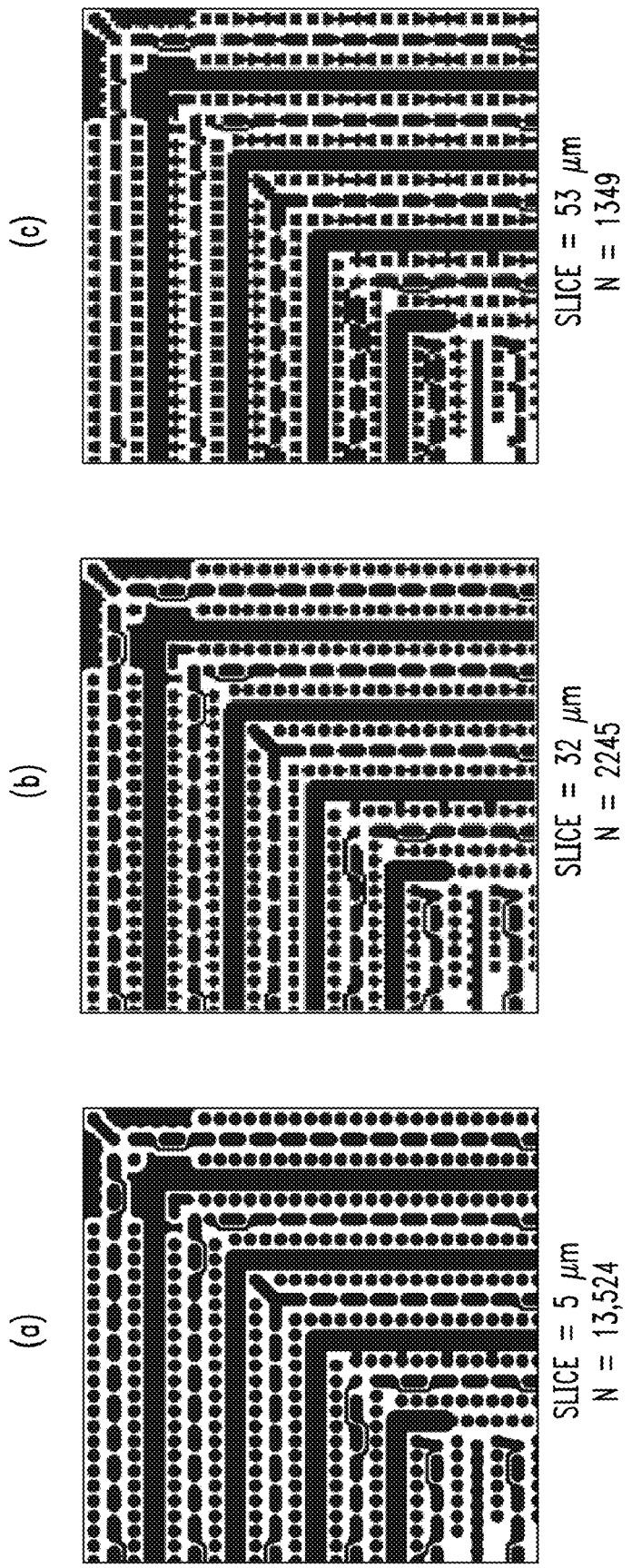
FIGS. 11A through 11C depict exemplary FEM image slices illustrating an effect of slice thickness on FEM image quality, in accordance with an embodiment of the present invention.

Image construction accuracy is dependent, at least in part, on slice thickness. With very thin slices (e.g., less than about 10 μm), substantially all features in the original bitmap image are preserved, but there are more slices to process, thereby increasing computation time and memory storage requirements. Thus, there is a trade-off between image accuracy and computation time and storage size. By way of example only, FIGS. 11A through 11C depict exemplary FEM image slices illustrating the effect of slice thickness on FEM image quality, according to an aspect of the invention. In FIG. 11A, with a horizontal resolution (i.e., slice thickness) of 5 μm, 13,524 slices are required for this tile. In FIG. 11B, with a horizontal resolution of 32 μm, 2245 slices are required for the tile. In FIG. 11C, with a horizontal resolution of 53 μm, 1349 slices are required for the tile (~10× reduction compared to a 5 μm resolution). Image quality noticeably degrades as the slice thickness increases.

Referring again to warp projection method 214 of FIG. 2, once the geometric features in a given layer of a tile are captured (e.g., in step 228), one or more thermomechanical parameters of the layer can be computed in step 230, such as by employing an analytical process. For example, in order to predict the amount of substrate warp, a CTE of each layer in the tile is preferably computed. An accuracy of the warp projection model generated by method 214 can be increased, according to aspects of the invention, by avoiding simplifying assumptions and approximations made in extracting the thermomechanical parameters of a given tile layer. Thus, aspects of the invention provide a technique for automating the extraction of thermomechanical parameters of a layer directly from the original bitmap image, or alternative geometric description file, of a circuit layer so that image-related approximations can be beneficially avoided.

Figure 12:
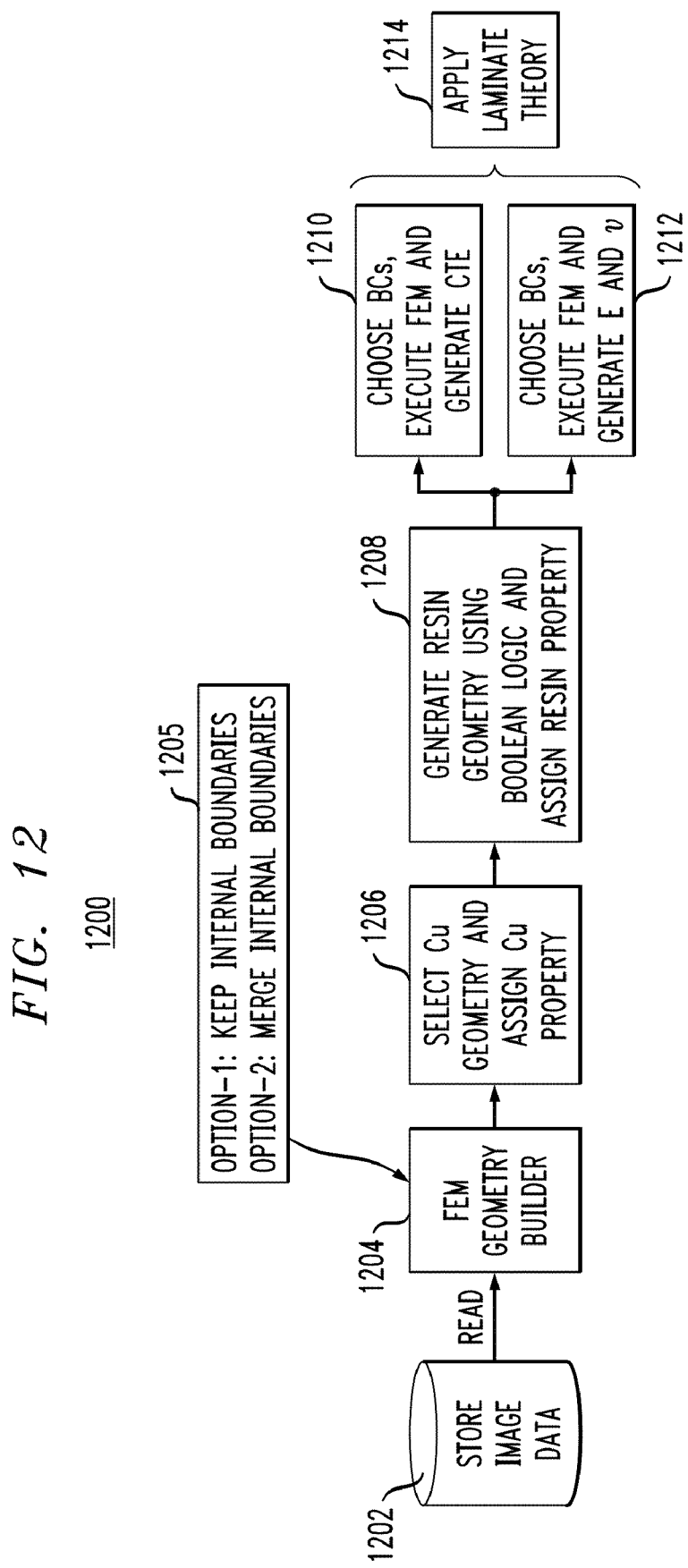
FIG. 12 is a block diagram depicting an exemplary FEM image generation and parameter estimation method, in accordance with an embodiment of the present invention.

FIG. 12 is a block diagram depicting an exemplary FEM image generation and parameter estimation method 1200, according to an embodiment of the present invention. At least portions of method 1200 may be implemented in one or more of blocks 228 and 230 shown in FIG. 2. Method 1200 receives, as input, sliced images representative of a bitmap image of a given circuit layer in a tile. The sliced images are preferably stored in a memory 1202, which may be consistent with memory 1014 shown in FIG. 10, and imported (read) into an FEM geometry builder 1204, or alternative processor, operative to reconstruct the circuit image with copper features identified from the sliced images.

In reconstructing the circuit image, FEM geometry builder 1204 is preferably operative to provide at least two options (e.g., in block 1205) for managing internal boundaries of a layer image. More particularly, in a first option (option 1) provided by the FEM geometry builder 1204, the internal boundaries of the layer image are preserved, and all copper features within a given boundary are retained. This may be desirable, for example, where there are multiple materials included within the given boundary. However, FEM meshing becomes unnecessarily fine using this option, thereby impacting computation time. In a second option (option 2) provided by the FEM geometry builder 1204, the internal boundaries of the layer image are merged so that islands of copper are identified. Using option 2, FEM meshing is coarser compared to option 1, thereby reducing computation time. However, any detail within a copper island can be lost using option 2. Thus, there is a trade-off between computation time and image detail retained.

The decision as to which option (e.g., option 1 or option 2) to implement for any given identified boundary in an image may be controlled as a function of a height, h, of a rasterized image boundary and a size, d, of one or more geometric features within the identified boundary. For example, when the size d of one or more features within the given boundary are greater than the height h of the rasterized image boundary (i.e., d>h), the FEM geometry builder 1204 is preferably operative to merge the internal boundaries and thereby save computation time. Likewise, when the size d of one or more features within the given boundary is less than or equal to the height h of the rasterized image boundary (i.e., d≦h), the FEM geometry builder 1204 may be operative to retain the internal boundaries and thereby provide enhanced image detail, at the expense of additional computation time. Various known image processing methodologies (e.g., minimum bounding box, etc.) may be suitable for use with the present invention.

Figure 13:
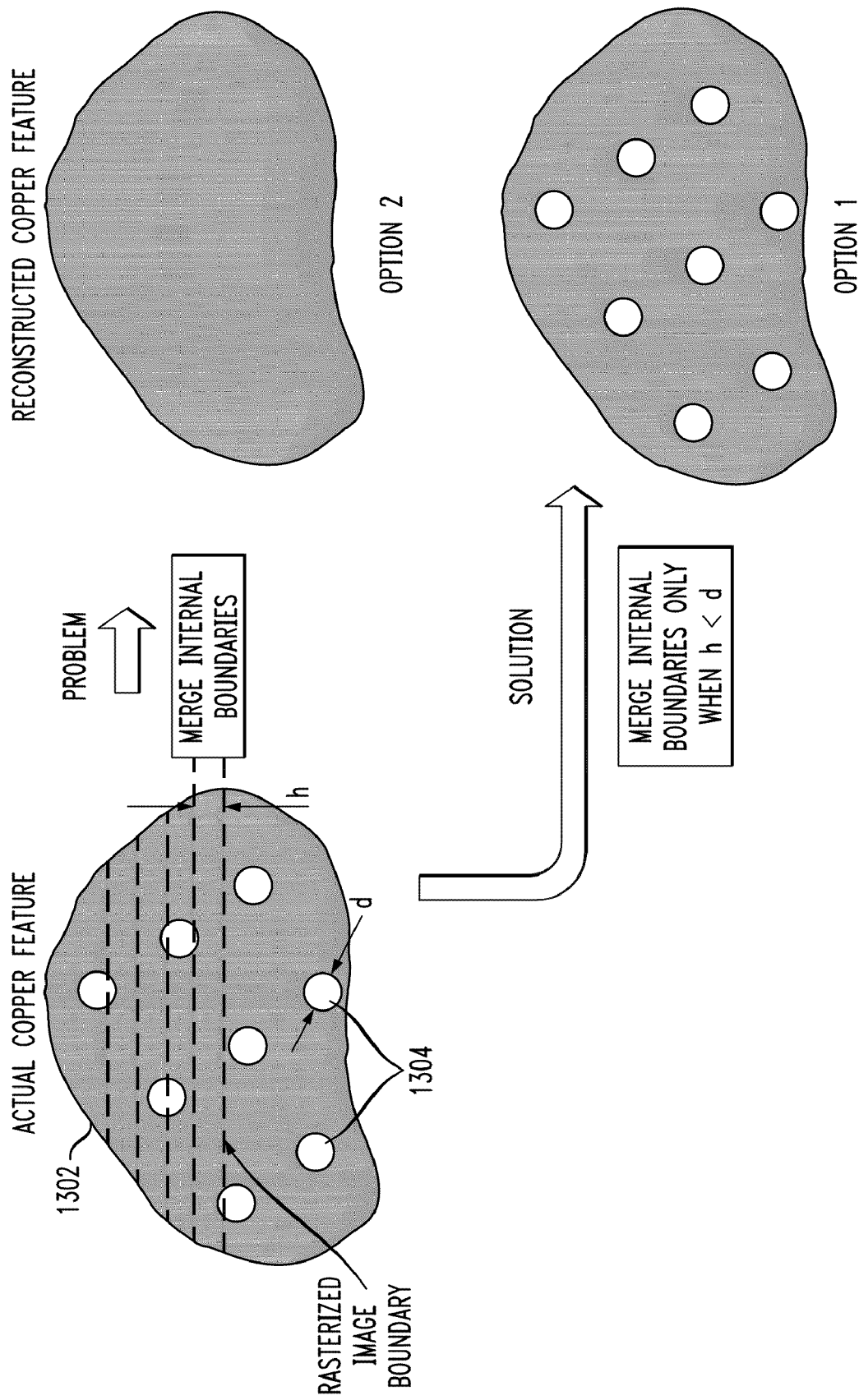
FIG. 13 is a conceptual view depicting an exemplary method for implementing a feature in the illustrative FEM image generation and parameter estimation method shown in FIG. 12, in accordance with an embodiment of the present invention.

FIG. 13 is a conceptual view depicting exemplary options for handling geometric features within a given boundary in the illustrative FEM image generation and parameter estimation method 1200 shown in FIG. 12, in accordance with an embodiment of the invention. FIG. 13 demonstrates the problem of loosing internal image details and the need for a special image processing feature that is required to capture the full image features accurately within the FEM geometry generator 1204. For example, consider an island of copper 1302 having multiple via holes 1304 therein. Assuming the image details within the copper feature 1302 are to be retained for accurate results, in an image manipulation phase implemented in the FEM geometry builder 1204 (FIG. 12), a Boolean function is preferably generated and utilized in which only the internal boundaries with less than a prescribed separation distance are merged. Therefore by slicing the original image with a height parameter h smaller than the smallest image feature size that must be retained (in this case the via hole diameter d), the internal features of an image on an island of copper are automatically retained.

Figure 14:
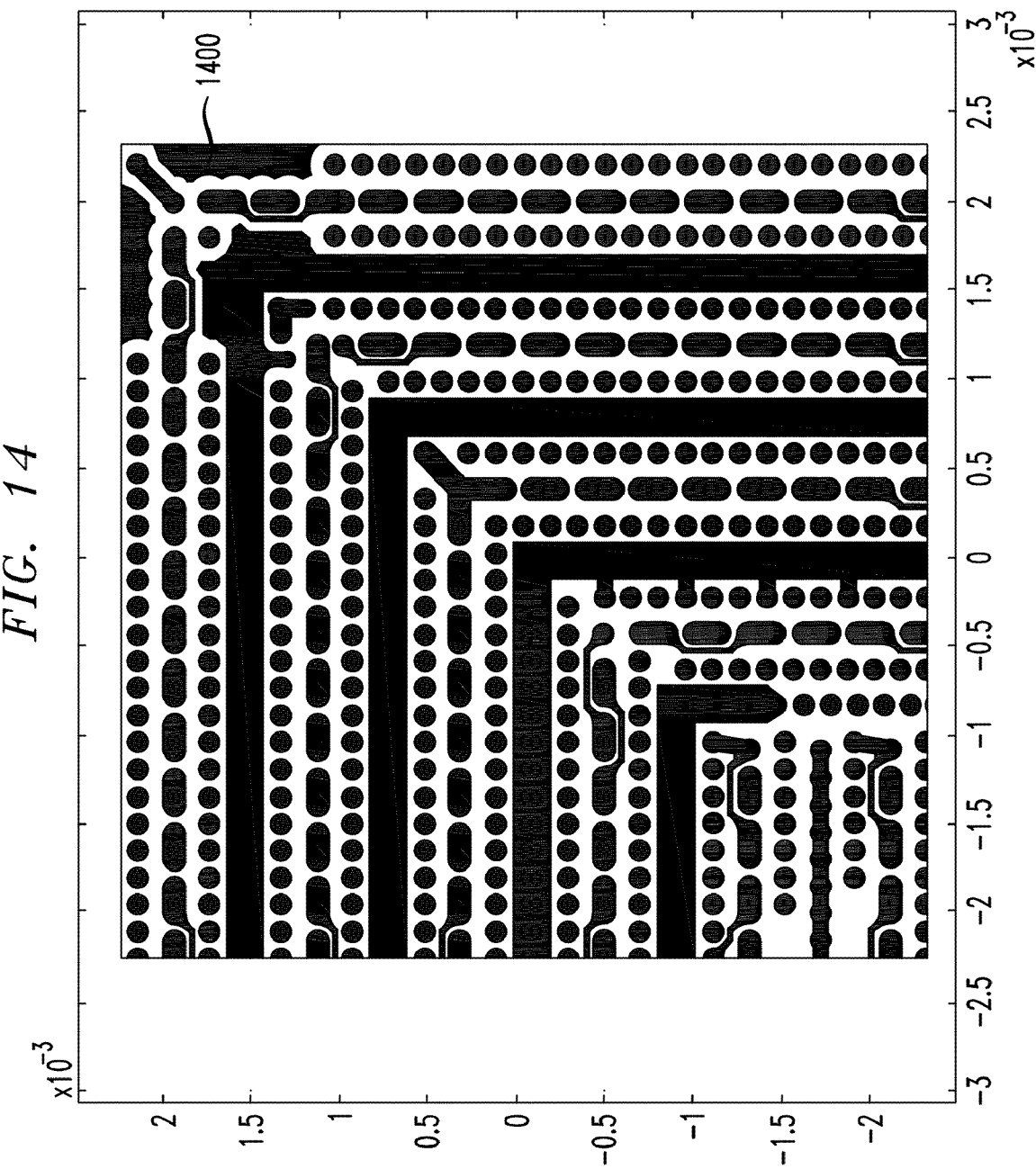
FIG. 14 is a top plan view depicting an exemplary constructed FEM image defining copper features in a circuit layer in a tile of an organic substrate, in accordance with an embodiment of the present invention.

With continued reference to FIG. 12, once the FEM geometry builder 1204 has generated the FEM image, the copper domain, including copper geometries, is preferably selected and assigned thermomechanical properties in block 1206. FIG. 14 shows an exemplary constructed FEM image 1400 defining a copper layer in a tile of an organic substrate, in accordance with an embodiment of the invention. In the image 1400, black portions define cooper features in the circuit layer. As can be observed, the complex geometry can be automatically recreated within an FEM geometry building environment. Instead of generating a sanitized image as shown in FIG. 6 corresponding to at least a portion of image 510 of FIG. 5, the full details of the circuit layer are retained.

Figure 15:
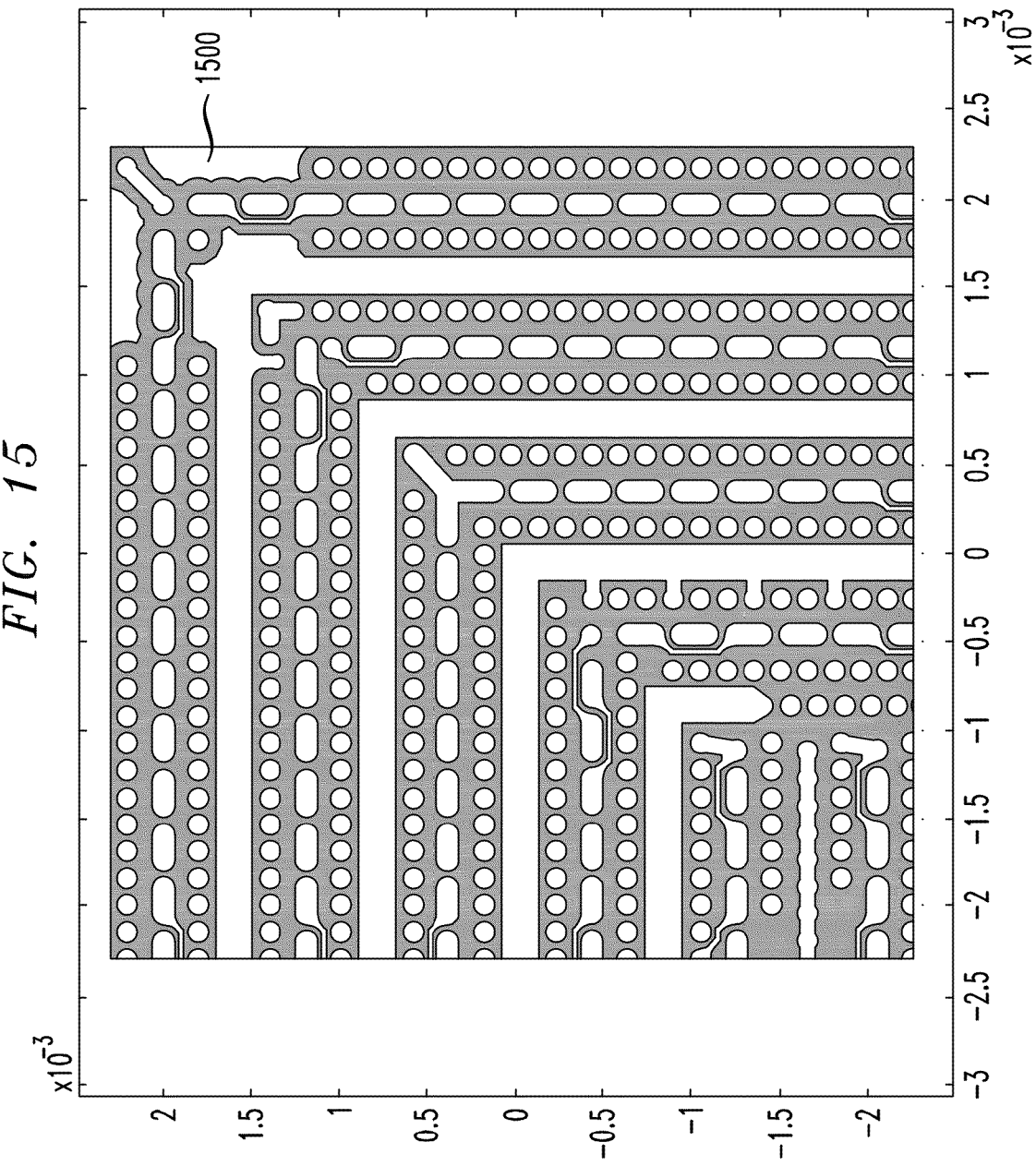
FIG. 15 is a top plan view depicting an exemplary constructed FEM image defining resin and copper features in a circuit layer in a tile of an organic substrate, in accordance with an embodiment of the present invention.

Subsequently, in block 1208, a resin domain, including resin geometries, is preferably generated and assigned thermomechanical properties. The resin domain may be generated from the copper domain using, for example, Boolean logic (or any other form of image manipulation). The automated method of property assignment performed in block 1208 is simplified in an organic substrate analysis because the organic substrate uses only two different types of material, namely, copper and resin (or alternative dielectric material), in its circuit layer construction. Thus, any portions of the copper geometry image (e.g., 1400 shown in FIG. 14) that are not copper are, by default, resin features. FIG. 15 shows an exemplary constructed FEM image 1500 defining resin features (dark portions of the image) and copper features (light portions of the image) in the FEM environment. FEM image 1500 may be a logical complement of FEM image 1400 shown in FIG. 14.

As apparent from FIG. 12, once the respective copper and resin domains are defined in blocks 1206 and 1208, the edges of the layer under consideration are preferably selected in blocks 1210 and 1212. This is achieved, for example, by collecting all the boundaries (e.g., boundary conditions of the copper and resin features along each edge using selection logic, or alternative processing, provided by the FEM procedure. Next, thermomechanical properties of the circuit layer are determined using, for example, at least two numerical methodologies. A first method 1210 preferably comprises CTE computation along x and y directions in a single contraction experiment. A second method 1212 preferably comprises computing modulus (E) and Poisson's ratio (ν). In computing the CTE and modulus and Poisson's ratio corresponding to the given circuit layer, the edges at which relevant boundary conditions are to be imposed are first selected, as previously stated.

Figure 16:
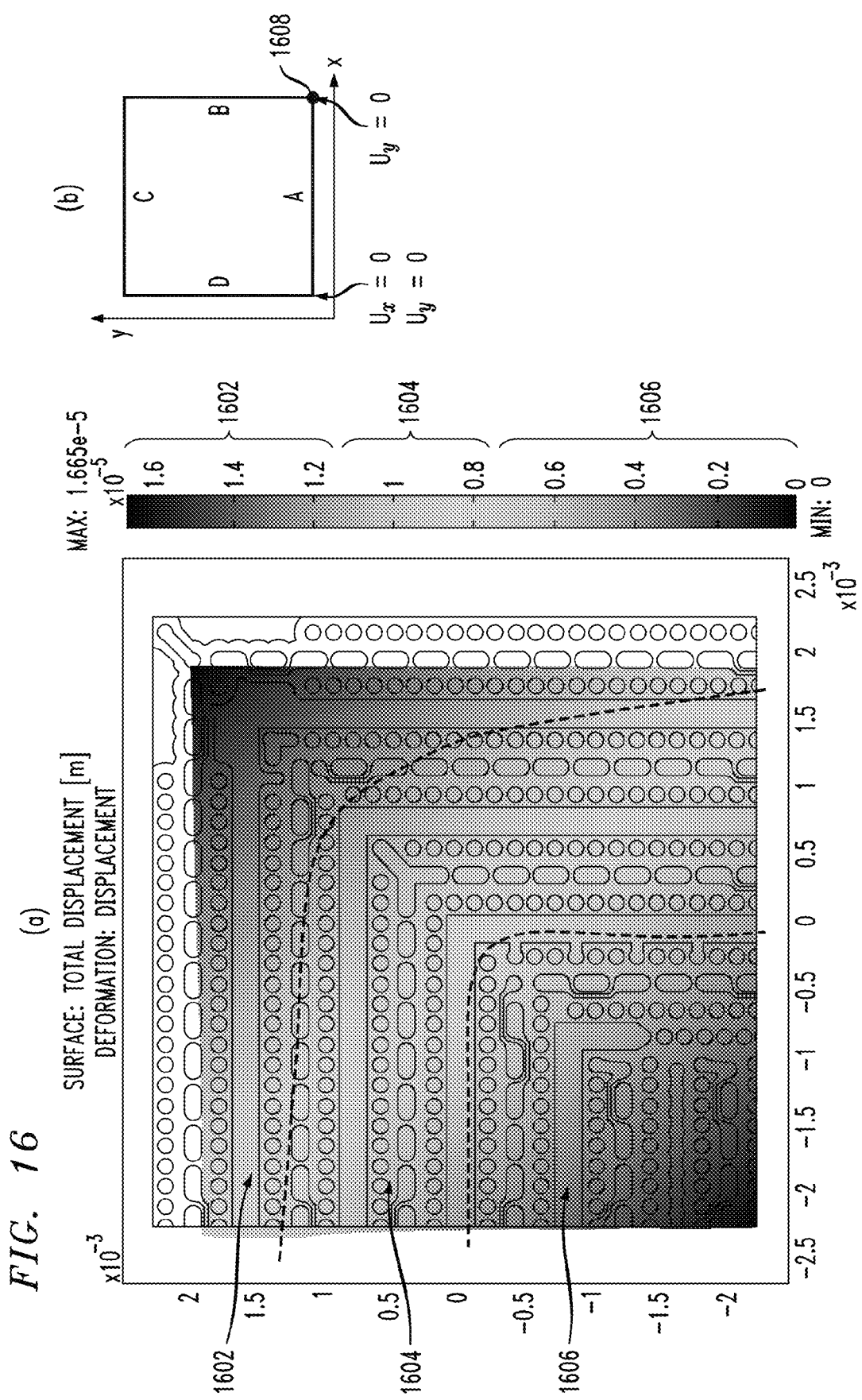
FIGS. 16A and 16B depict an exemplary method for determining a CTE estimation for the illustrative structural pattern shown in FIG. 15, in accordance with an embodiment of the present invention.

FIGS. 16A and 16B depict an exemplary method for determining CTE estimation for the illustrative structural pattern shown in FIG. 15, in accordance with an embodiment of the present invention. For CTE extraction, only point boundary conditions are required. In FIG. 16A, the effect of thermal expansion (or contraction) of the geometry is shown. Three general displacement regions are depicted: region 1602 (e.g., in a range from about 12 μm to about 16 μm), region 1604 (e.g., from 8 μm to about 12 μm), and region 1606 (e.g., less than about 8 μm). In FIG. 16B, edges A, B, C and D are essentially free and only the point at the origin is held fixed (e.g., $U_x=U_y=0$) and the point 1608 at the end of edge A is allowed to move freely along the x direction but constrained in the y direction. By solving the thermal expansion (or contraction) FEM problem for a prescribed temperature swing (e.g., 100° C.), the displacements of the four edges A, B, C, D can be estimated.

Since the edges generally do not remain straight during the expansion process, a rational method is preferably used to estimate the representative displacement of a given edge. The average displacement along x and y axes are estimated, for example, using following expressions. It is to be understood that the invention is not limited to the methodologies employed to determine the representative displacement of the edges.

$$\overline{U}_x = \frac{1}{L}\int_0^L U_x\, dy \qquad (1)$$

-continued $$\overline{U}_y = \frac{1}{L} \int_0^L U_y \, dx \quad (2)$$

$$\Delta \overline{U}_y = \overline{U}_{y(on\_edge\_C)} - \overline{U}_{y(on\_edge\_A)} \quad (3)$$

$$\overline{CTE}_y = \frac{\Delta \overline{U}_y}{L \cdot \Delta T} \quad (4)$$

The integral of displacement in the x direction (equation 1) is calculated along edges B and D. For displacement in the y direction (equation 2), the integral is calculated along edges A and C. The relative motion between two near parallel edges is simply determined as a difference between corresponding average displacements. Therefore, the elongation (or contraction) along the y-axis, for example, is given by equation 3, and the corresponding CTE along the y-axis for a temperature difference, ΔT, is given by equation 4.

Figure 17:
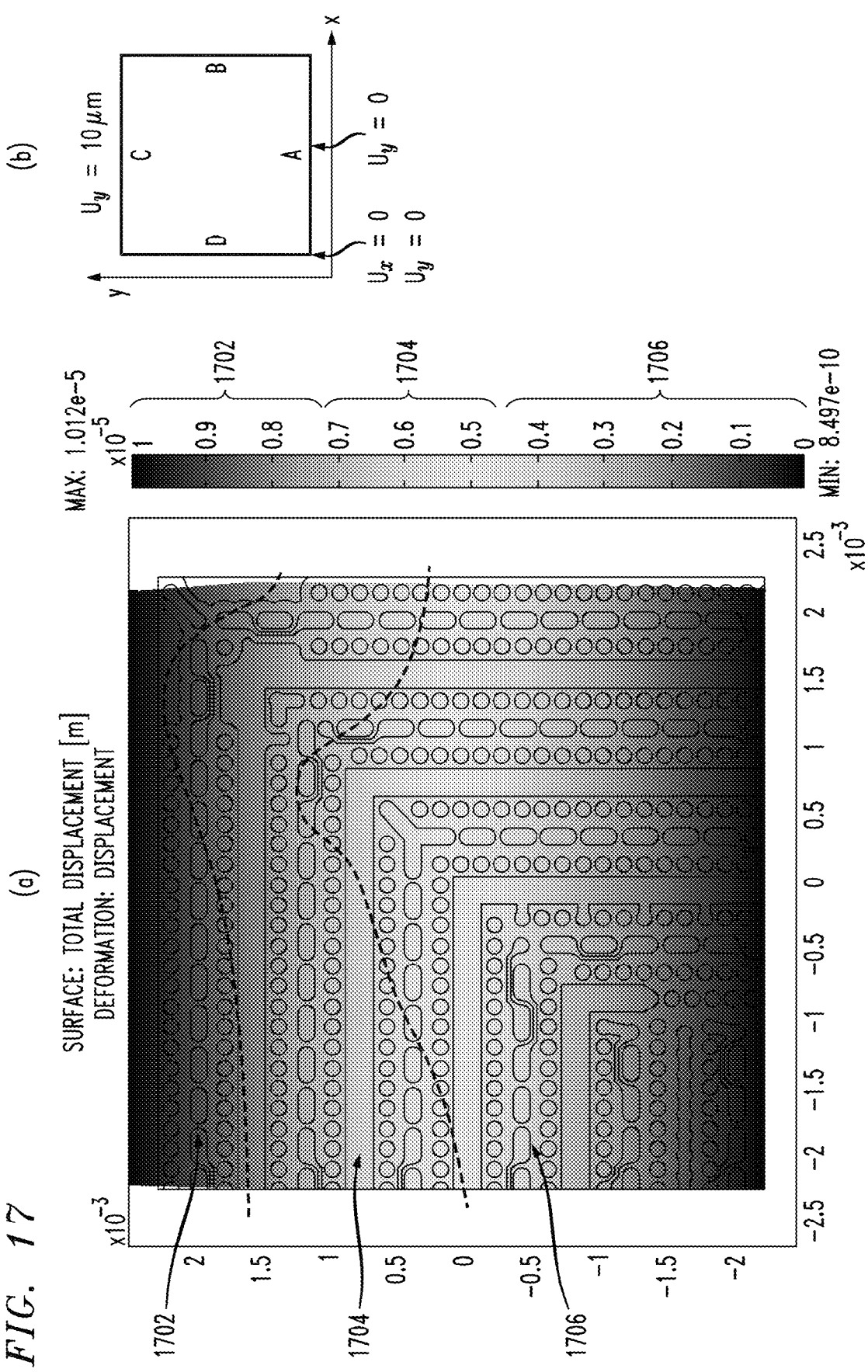
FIGS. 17A and 17B depict an exemplary method for determining a modulus and Poisson ratio estimation for the illustrative structural pattern shown in FIG. 15, in accordance with an embodiment of the present invention.

For modulus computation, different boundary conditions are specified. More particularly, temperature is held fixed at the value at which the modulus (E) and Poisson's ratio (ν) are required. FIGS. 17A and 17B depict an exemplary method for determining modulus and Poisson's ratio estimation for the illustrative structural pattern shown in FIG. 15, according to an aspect of the invention. FIG. 17A shows a numerical methodology for estimating modulus in the y direction. In FIG. 17A, three general displacement regions are depicted: region 1702 (e.g., about 7-10 μm), region 1704 (e.g., about 5-7 μm), and region 1706 (e.g., less than about 5 μm).

To compute E along the y-axis, as shown in FIG. 17B, displacement of edge A along the y-axis is constrained at $U_y=0$, with displacement along the x-axis, $U_x$, being free, and edge C is given a predetermined displacement (e.g., 10 μm) along the y-axis while allowing its displacement in the x direction to be free. A 2-D plane stress FEM solution will produce a distributed edge force in the y direction, $F_y$, required to produce 10 μm of displacement, where the average force in the y direction, $\overline{F}_y$, is given by equation (5) below and the corresponding average stress in the y direction, $\overline{\sigma}_y$, is given by equation (6) below. Observe that $U_x$ and $U_y$ produced by the FEM solution at a fixed temperature is different from the values that are produced for CTE estimates in equations (1) through (4) above.

$$\overline{F}_y = \frac{1}{L} \int_0^L F_y \, dx \quad (5)$$

$$\overline{\sigma}_y = \frac{1}{L^2} \int_0^L F_y \, dx \quad (6)$$

The average stress on edge C divided by average strain would produce an estimate for $E_y$ as defined by equation (7) below.

$$E_y = \overline{\sigma}_y/(10*10^{-6}/L) \quad (7)$$

The ratio of strain in the x direction divided by strain in the y direction will produce the estimate for Poisson's ratio $\nu_{xy}$. Observe that the applied strain with assumed boundary conditions for a 10 μm displacement is given by equation (8) below. The corresponding strain in the x direction due to applied strain in the y direction is given by equation (9) below. Hence Poisson ratio $\nu_{xy}$ is given by equation (10) below.

$$\varepsilon_y = (10*10^{-6}/L) \quad (8)$$

$$\overline{\varepsilon}_x = \frac{1}{L^2} \int_0^L U_x \, dy \quad (9)$$

$$\nu_{xy} = \overline{\varepsilon}_x/\varepsilon_y \quad (10)$$

The process is repeated for x-directional estimates of modulus $E_x$ and other parameters.

By way of example only and without loss of generality, the impact of using a detailed image-to-FEM conversion, consistent with the teachings of the invention herein, as compared to a conventional warp estimation methodology is described as follows. A layer corresponding to exemplary image 1500 shown in FIG. 15 is assumed to have a copper content of about 56.3%. Corresponding to this percentage, the illustrative parametric plots depicted in FIG. 9 predict the modulus E to be about 25.6 gigapascal (GPa) and the CTE to be about 21.7 parts-per-million per degree Kelvin (ppm/° K), whereas the FEM analysis of the detailed structure predicts different values as listed in Table 1 below:

TABLE 1

| Parameter | Parametric Curve | FEM Image Analysis |
|---|---|---|
| $E_x$ [GPa] | 25.63 | 18.06 |
| $E_y$ [GPa] | 25.63 | 17.58 |
| $\nu_{xy}$ | 0.11 | 0.16 |
| $CTE_x$ [ppm/° K.] | 21.71 | 24.81 |
| $CTE_y$ [ppm/° K.] | 21.71 | 25.53 |

As apparent from Table 1 above, substantial differences in the thermomechanical parameters can be observed for each method.

With reference again to FIG. 2, once the thermomechanical properties of the circuit layer have been determined in step 230, the second warp projection method 214 preferably proceeds to utilize principles of laminate theory, or an alternative processing technique, in step 232 to effectively construct a given 3-D tile of the substrate from the individual circuit layers associated with the given tile. Step 232 may be consistent with step 222 described above. After all of the tiles have been processed, a warp projection result for the organic substrate is generated in step 234. This result may subsequently be used to predict whether or not the organic substrate will exhibit a warping that meets a prescribed threshold value.

Figure 18:
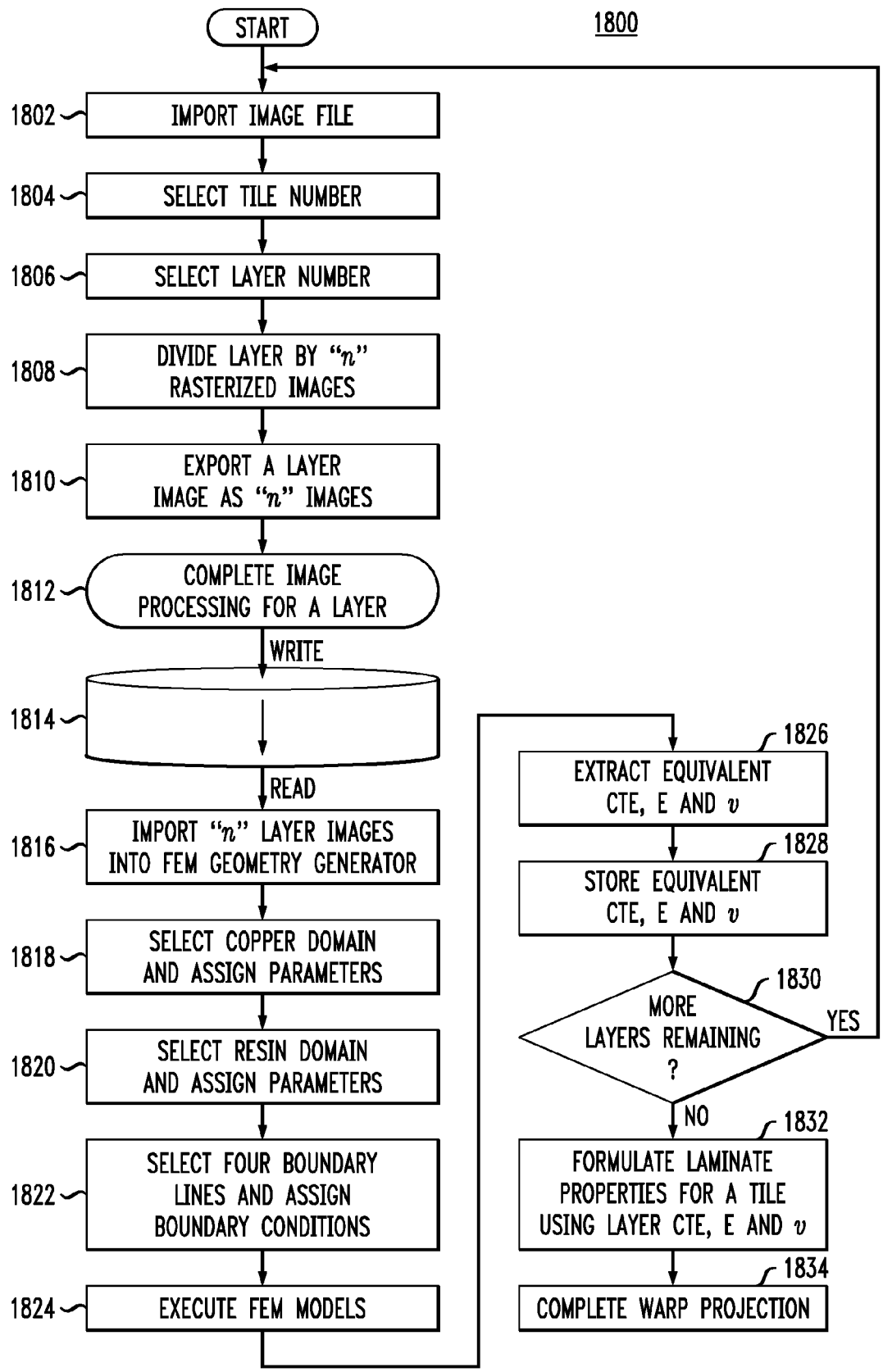
FIG. 18 is a flow diagram depicting an exemplary method for estimating warp of an organic substrate, in accordance with an embodiment of the present invention.

FIG. 18 is a flow diagram depicting overall steps in an exemplary method 1800 for estimating thermomechanical properties (e.g., including warp) from an electronic image, or alternative geometric description, of a circuit layer of an organic substrate, in accordance with an embodiment of the present invention. Method 1800 begins by importing an image file in step 1802. The image file is preferably a bitmap image or an alternative geometric description of the organic substrate. As previously stated in conjunction with FIG. 3, the substrate is preferably divided into a plurality of tiles, or alternative regions, one of which is selected for processing at a given time; each tile comprises multiple layers. In step 1804, a current tile number is selected for processing. Once a current tile is chosen, a given circuit layer in the tile is selected for processing in step 1806. In step 1808, the selected layer is divided by a plurality, n, of rasterized images or slices, where n is an integer greater than one. Step 1808 may be implemented in accordance with method 1000 previously described in connection with FIG. 10, although the invention is not limited to such a method. Next, the layer image is exported as n images in step 1810. Image processing for the layer is completed in step 1812 to generate a 2-D FEM image of the layer. This image may then be stored (e.g., via a write operation) in memory 1814 for use by a subsequent processing step(s).

In step 1816, the n layer images are preferably read from memory 1814 into a FEM geometry generator (e.g., FEM geometry builder 1204 shown in FIG. 12), or alternative processor, operative to reconstruct the circuit image with copper features identified from the rasterized (sliced) images. Step 1816 may, for a given identified geometric feature, either retain internal boundaries within the given feature or merge one or more internal boundaries. An illustrative method for accomplishing this feature according to the invention was described herein in conjunction with FIGS. 12 and 13. Once the FEM geometry generator has constructed the FEM image, the copper domain, including copper geometries, is preferably selected and assigned thermomechanical properties in step 1818. In step 1820, a resin (or alternative dielectric material) domain is selected, including resin geometries, and thermomechanical properties are assigned to the resin domain. As previously stated, the resin domain may be generated from the copper domain using, for example, a Boolean logical complement or alternative image processing.

Once the respective copper and resin domains are defined, boundary lines (edges) of the selected layer are preferably selected in step 1822. This can be accomplished, for example, by assigning boundary conditions of the copper and resin features along each edge of the selected layer using selection logic, or alternative processing, provided by the FEM procedure. In step 1824, FEM models are executed using the assigned boundary conditions. Equivalent CTE, modulus and Poisson's ratio parameters are then extracted in step 1826 and preferably stored in step 1828 for the selected circuit layer.

Step 1830 checks to determine whether all layers of the given tile have been processed. When all layers have been processed, step 1832 builds a laminate structure corresponding to the tile as a function of the respective CTE, modulus and Poisson's ratio parameters of the individual layers. A warp estimation (projection) is then determined for the given tile in step 1834.

At least a portion of the techniques of the present invention may be implemented in one or more integrated circuits. In forming integrated circuits, die are typically fabricated in a repeated pattern on a surface of a semiconductor wafer. Individual die are cut or diced from the wafer, then packaged as integrated circuits. In packaging the dies, individual die are attached to a receiving substrate according to methods of the invention. One skilled in the art would know how to dice wafers to produce integrated circuits. Integrated circuits so manufactured are considered part of this invention.

An integrated circuit formed in accordance with techniques of the present invention can be employed in essentially any application and/or electronic system requiring an accurate prediction of thermomechanical properties of an organic substrate. Suitable systems for implementing the invention may include, but are not limited to, personal computers, test and measurement devices, portable communications devices (e.g., cell phones), etc. Systems incorporating such integrated circuits are considered part of this invention. For future computer technology that stacks multiple layers of processors and memories, where each device layer is built on very thin silicon die (e.g., about 10-50 µm thick), warp due at least in part to the complexity of the circuits can become significant, and the warp projection method according to embodiments of the invention can be beneficially applied in such configurations to optimize performance of the device, among other advantages.

Given the teachings of the invention provided herein, one of ordinary skill in the art will be able to contemplate other implementations and applications of the techniques of the invention.

Although illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of characterizing an organic substrate including a plurality of circuit layers, the method comprising the steps of:
   receiving an image of the organic substrate, the image including a geometric description of the plurality of circuit layers of the substrate;
   selecting a given one of the plurality of circuit layers for processing;
   converting the image to a two-dimensional finite element model (FEM) image of the given one of the circuit layers;
   determining at least one of a coefficient of thermal expansion (CTE), modulus and Poisson's ratio of the FEM image of the given one of the circuit layers;
   repeating the steps of selecting a given one of the plurality of circuit layers, converting the image to a two-dimensional FEM image, and determining at least one of a CTE, modulus and Poisson's ratio of the FEM image for all of the plurality of circuit layers corresponding to at least a portion of the organic substrate; and
   constructing a three-dimensional representation of at least a portion of the organic substrate including the plurality of circuit layers as a function of at least one of the CTE, modulus and Poisson's ratio of each of the plurality of circuit layers,
   wherein the steps of receiving, selecting, converting, determining, repeating, and constructing are performed by a computing device.

2. The method of claim 1, further comprising the step of dividing the organic substrate into a plurality of substantially equal-sized regions as a function of the geometric description of the plurality of circuit layers of the substrate.

3. The method of claim 1, wherein the image of the organic substrate comprises a bitmap image.

4. The method of claim 1, wherein the image of the organic substrate comprises a board file.

5. The method of claim 1, wherein the step of converting the image to a two-dimensional FEM image comprises rasterizing the image.

6. The method of claim 5, wherein the step of rasterizing the image comprises:
   dividing the image into a plurality of slices of substantially equal thickness; and
   combining the plurality of slices to form a stacked structure representing features in the image as a function of individual polygons having a height equal to a thickness of the slices.

7. The method of claim 5, wherein the step of converting the image to a two-dimensional FEM image of the given one of the circuit layers comprises the steps of:
   identifying at least one geometric feature within the given one of the circuit layers;
   merging internal boundaries of the at least one geometric feature when a size of the at least one feature is greater than a thickness of the slices; and retaining internal boundaries of the at least one geometric feature when a size of the at least one feature is less than or equal to a thickness of the slices.

8. The method of claim 1, further comprising the step of storing the three-dimensional representation of at least a portion of the organic substrate in memory.

9. The method of claim 1, wherein the step of determining at least one of a CTE, modulus and Poisson's ratio of the FEM image comprises:
selecting a metal domain associated with the given one of the plurality of circuit layers, the metal domain including a plurality of metal geometries; and
assigning at least one thermomechanical property to each of the plurality of metal geometries.

10. The method of claim 1, wherein the step of determining at least one of a CTE, modulus and Poisson's ratio of the FEM image comprises:
selecting a metal domain associated with the given one of the plurality of circuit layers, the metal domain including a plurality of metal geometries;
assigning at least one thermomechanical property to each of the plurality of metal geometries;
generating a dielectric material domain as a function of the metal domain, the dielectric material domain including a plurality of dielectric geometries; and
assigning at least one thermomechanical property to each of the plurality of dielectric geometries.

11. The method of claim 10, wherein the step of determining at least one of a CTE, modulus and Poisson's ratio of the FEM image further comprises:
assigning boundary conditions corresponding to at least one of the metal and dielectric features along each edge of the given one of the plurality of circuit layers; and
executing FEM models as a function of the assigned boundary conditions.

12. The method of claim 10, wherein the dielectric domain is a Boolean logical complement of the metal domain.

13. The method of claim 1, wherein the step of constructing a three-dimensional representation of at least a portion of the organic substrate comprises combining the plurality of circuit layers using principles of laminate theory.

14. The method of claim 1, further comprising determining whether or not to fabricate the organic substrate based at least in part on the three-dimensional representation of at least a portion of the organic substrate.

15. An apparatus for characterizing an organic substrate including a plurality of circuit layers, the apparatus comprising:
memory; and
at least one processor coupled to the memory, the at least one processor being operative: to receive an image of the organic substrate, the image including a geometric description of the plurality of circuit layers of the substrate; to select a given one of the plurality of circuit layers for processing; to convert the image to a two-dimensional finite element model (FEM) image of the given one of the circuit layers; to determine at least one of a coefficient of thermal expansion (CTE), modulus and Poisson's ratio of the FEM image of the given one of the circuit layers; to repeat steps of selecting the given one of the plurality of circuit layers, converting the image to a two-dimensional FEM image, and determining at least one of a CTE, modulus and Poisson's ratio of the FEM image for all of the plurality of circuit layers corresponding to at least a portion of the organic substrate; and to construct a three-dimensional representation of at least a portion of the organic substrate including the plurality of circuit layers as a function of at least one of the CTE, modulus and Poisson's ratio of each of the plurality of circuit layers.

16. The apparatus of claim 15, wherein the memory is operative to store sliced images representative of a bitmap image of the given layer in at least a portion of the substrate, the apparatus further comprising a FEM geometry builder operative to reconstruct the circuit layer image with metal features identified from the sliced images.

17. The apparatus of claim 15, wherein the at least one processor is further operative to combine the plurality of circuit layers using principles of laminate theory.

18. The apparatus of claim 15, wherein the at least one processor is further operative to divide the organic substrate into a plurality of substantially equal-sized regions as a function of the geometric description of the plurality of circuit layers of the substrate.

19. The apparatus of claim 15, wherein the at least one processor is further operative to select a metal domain associated with the given one of the plurality of circuit layers, the metal domain including a plurality of metal geometries; to assign at least one thermomechanical property to each of the plurality of metal geometries; to generate a dielectric material domain as a function of the metal domain, the dielectric material domain including a plurality of dielectric geometries; and to assign at least one thermomechanical property to each of the plurality of dielectric geometries.

20. An article of manufacture for characterizing an organic substrate including a plurality of circuit layers, the article comprising a computer readable storage medium having one or more programs embodied therewith, wherein the one or more programs, when executed by a computer, perform steps of:
receiving an image of the organic substrate, the image including a geometric description of the plurality of circuit layers of the substrate;
selecting a given one of the plurality of circuit layers for processing;
converting the image to a two-dimensional finite element model (FEM) image of the given one of the circuit layers;
determining at least one of a coefficient of thermal expansion (CTE), modulus and Poisson's ratio of the FEM image of the given one of the circuit layers;
repeating the steps of selecting a given one of the plurality of circuit layers, converting the image to a two-dimensional FEM image, and determining at least one of a CTE, modulus and Poisson's ratio of the FEM image for all of the plurality of circuit layers corresponding to at least a portion of the organic substrate; and
constructing a three-dimensional representation of at least a portion of the organic substrate including the plurality of circuit layers as a function of at least one of the CTE, modulus and Poisson's ratio of each of the plurality of circuit layers.

* * * * *